United States Patent
You et al.

(10) Patent No.: US 11,026,107 B2
(45) Date of Patent: Jun. 1, 2021

(54) DATA TRANSMISSION METHOD AND TERMINAL DEVICE

(71) Applicant: Huawei Technologies Co., Ltd., Shenzhen (CN)

(72) Inventors: Chunhua You, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/366,478

(22) Filed: Mar. 27, 2019

(65) Prior Publication Data

US 2019/0223035 A1   Jul. 18, 2019

Related U.S. Application Data

(63) Continuation of application No. PCT/CN2016/100666, filed on Sep. 28, 2016.

(51) Int. Cl.
*H04W 72/12* (2009.01)
*H04W 24/08* (2009.01)
*H04W 72/14* (2009.01)
*H04W 52/02* (2009.01)

(52) U.S. Cl.
CPC ....... *H04W 24/08* (2013.01); *H04W 52/0212* (2013.01); *H04W 72/1284* (2013.01); *H04W 72/14* (2013.01); *Y02D 30/70* (2020.08)

(58) Field of Classification Search
None
See application file for complete search history.

(56) References Cited

U.S. PATENT DOCUMENTS

| | | | |
|---|---|---|---|
| 2013/0100936 A1 | 4/2013 | Pettersson | |
| 2015/0092632 A1 | 4/2015 | Park | |
| 2016/0227566 A1* | 8/2016 | Bergstrom | H04W 72/1268 |
| 2018/0014320 A1 | 1/2018 | Xu et al. | |
| 2018/0041310 A1* | 2/2018 | Wu | H04L 1/1851 |
| 2018/0042043 A1* | 2/2018 | Babaei | H04L 5/0082 |
| 2018/0069589 A1 | 3/2018 | Liu et al. | |
| 2018/0077644 A1* | 3/2018 | Dinan | H04L 5/0091 |
| 2018/0110084 A1* | 4/2018 | Dinan | H04W 76/28 |

(Continued)

FOREIGN PATENT DOCUMENTS

| | | |
|---|---|---|
| CN | 101489251 A | 7/2009 |
| CN | 103298130 A | 9/2013 |

(Continued)

OTHER PUBLICATIONS

Nokia et al.,"On Two-Stage UL scheduling for eLAA", 3GPP TSG RAN WG1 Meeting #86, XP051125685, R1-167074,Gothenburg, Sweden, Aug. 22-26, 2016, 8 pages.

(Continued)

*Primary Examiner* — Jenkey Van
(74) *Attorney, Agent, or Firm* — Slater Matsil, LLP

(57) ABSTRACT

Embodiments of the present application provide a data transmission method and a terminal device. The method includes: obtaining, by a terminal device, a first indication; and monitoring, by the terminal device, a physical channel within a preset first time region to obtain a second indication, where the first indication and the second indication are used by the terminal device to determine a resource for data transmission.

14 Claims, 5 Drawing Sheets

(56) References Cited

U.S. PATENT DOCUMENTS

| | | | |
|---|---|---|---|
| 2019/0223162 A1* | 7/2019 | Suzuki | H04W 72/12 |
| 2020/0053707 A1* | 2/2020 | Babaei | H04W 72/042 |

FOREIGN PATENT DOCUMENTS

| | | | |
|---|---|---|---|
| CN | 103875298 A | 6/2014 | |
| CN | 103986566 A | 8/2014 | |
| CN | 105611641 A | 5/2016 | |
| WO | 2016037386 A1 | 3/2016 | |
| WO | 2016138632 A1 | 9/2016 | |

OTHER PUBLICATIONS

Huawei, et al., "Two-stage scheduling for eLAA", 3GPP TSG RAN WG1 Meeting #86, XP051125232, R1-166137, Gothenburg, Sweden, Aug. 22-26, 2016, 6 pages.

Samsung, "Discussion on two-step UL grant scheduling", 3GPP TSG RAN WG1 Meeting #86, XP051125514, R1-166691, Gothenburg, Sweden, Aug. 22-26, 2016, 4 pages.

ZTE, "Uplink data scheduling and transmission for NR frame structure", 3GPP TSG RAN WG1 Meeting #86, XP051140213, R1-166407, Gothenburg, Sweden, Aug. 22-26, 2016, 6 pages.

3rd Generation Partnership Project; Technical Specification Group Radio Access Network; Evolved Universal Terrestrial Radio Access (E-UTRA); Physical layer procedures (Release 13), 3GPP TS 36.213 V13.2.0 (Jun. 2016), 381 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP TS 36.300 V13.4.0 (Jun. 2016), 310 pages.

3rd Generation Partnership Project; Technical Specification Group Radio Access Network; Evolved Universal Terrestrial Radio Access (E-UTRA); Medium Access Control (MAC) protocol specification (Release 13), 3GPP TS 36.321 V13.2.0 (Jun. 2016), 91 pages.

3rd Generation Partnership Project; Technical Specification Group Radio Access Network; Evolved Universal Terrestrial Radio Access Network (E-UTRAN); M2 Application Protocol (M2AP) (Release 13), 3GPP TS 36.443 V13.3.0 (Mar. 2016), 92 pages.

* cited by examiner

DATA TRANSMISSION METHOD AND TERMINAL DEVICE

CROSS-REFERENCE TO RELATED APPLICATIONS

This application is a continuation of International Application No. PCT/CN2016/100666, filed on Sep. 28, 2016, the disclosure of which is hereby incorporated by reference in its entirely.

TECHNICAL FIELD

The present application relates to the field of communications technologies, and more specifically, to a data transmission method and a terminal device.

BACKGROUND

In a Long Term Evolution (LTE) system, a terminal device performs uplink transmission in a corresponding subframe by receiving an uplink grant (UL grant) resource sent by a base station. A licensed-assisted access (LAA) manner is introduced in LTE. An LAA system uses a channel resource according to a Listen Before Talk (LBT) principle. To be specific, after it is sensed that a channel resource of an unlicensed spectrum is idle, the channel resource of the unlicensed spectrum is used to transmit data.

In the 3rd Generation Partnership Project (3GPP), a two-level scheduling mode is introduced for LAA. To be specific, when performing uplink transmission, a terminal device needs to obtain a two-level uplink grant including a first-level uplink grant and a second-level uplink grant.

However, in a current system, related technologies about the two-level scheduling mode are immature. For example, the current system does not include a related solution about whether to introduce a discontinuous reception (DRX) mechanism in the two-level scheduling mode. In addition, in the current system, the second-level grant cannot be monitored in time may occur. Consequently, it cannot be ensured that the terminal device completes data transmission in the two-level scheduling mode. Under such a circumstance, a new solution urgently needs to be designed to ensure that the terminal device completes the data transmission in the two-level scheduling mode.

SUMMARY

Embodiments of the present application provide a data transmission method and a terminal device, to ensure that a terminal device obtains a second indication, so as to complete data transmission in a two-level scheduling mode.

According to a first aspect, a data transmission method is provided. The method includes obtaining, by a terminal device, a first indication. The method also includes monitoring, by the terminal device, a physical channel within a preset first time region to obtain a second indication, where the first indication and the second indication are used by the terminal device to determine a resource for data transmission.

In this embodiment of the present application, the first indication and the second indication may indicate, to the terminal device, the resource to be used for the data transmission, for example, may indicate a time domain location to be used for the data transmission. This is not limited.

In this embodiment of the present application, the terminal device obtains the first indication, and monitors the physical channel within the preset first time region to obtain the second indication, where the first indication and the second indication are used by the terminal device to determine the resource for the data transmission. It can be ensured that the terminal device obtains the second indication, so as to complete the data transmission in a two-level scheduling mode.

In this embodiment of the present application, the first indication may be understood as an uplink transmission resource, and may be specifically understood as a first uplink grant; or, optionally, the first indication may include a first uplink grant and an uplink resource.

Optionally, the first indication may further include information about a range of the preset first time region. For example, the information about the range of the first time region may be duration of a valid subframe region.

Optionally, the first indication may further indicate that each uplink transmission of the terminal device is initial transmission or retransmission.

Optionally, the first uplink grant includes subframe offset information of a first subframe. For example, in the two-level scheduling mode, the first uplink grant may indicate duration of a valid subframe region to be used by the terminal device to perform the data transmission. The first uplink grant indicates an uplink transmission resource (for example, a frequency domain resource).

Optionally, the first uplink grant may further include related information used to indicate one or more times of uplink transmission of the terminal device, for example, hybrid automatic repeat request (HARQ) process identifier (ID) information used in each uplink transmission, and MCS information. Optionally, the first uplink grant may further indicate that each uplink transmission is initial transmission or retransmission.

Optionally, a physical layer of the terminal device may notify a MAC layer of the terminal device of information about the first uplink grant.

Optionally, the first indication or the first uplink grant may be sent by a network device and received by the terminal device. Optionally, the first indication or the first uplink grant may be sent by the network device to the terminal device by using a PDCCH.

Optionally, in this embodiment of the present application, the physical channel may be a physical downlink control channel (PDCCH).

Similarly, optionally, the second indication may be understood as a second uplink grant, or may be understood as an uplink transmission resource. Optionally, the second indication may include a second uplink grant and an uplink resource.

Optionally, the second indication or the second uplink grant may be sent by the network device and received by the terminal device.

Optionally, the second indication or the second uplink grant may be sent by the network device to the terminal device by using a PDCCH.

In this embodiment of the present application, optionally, for example, the first indication may indicate relative time information (for example, the offset information of the first subframe) of the terminal device, and the second indication may indicate absolute time information (a location of the first subframe) of the terminal device. The terminal device may determine, based on the first indication and the second indication, a subframe in which one transmission is to be performed, that is, determine a time domain resource for sending data. The "first subframe" is introduced for ease of description. The first subframe may be any subframe, for example, a start uplink subframe. This is not limited.

In some possible implementations, the preset first time region may be a timer (for example, an inactivity timer (DRX Inactivity Timer), or a retransmission timer (DRX UL Retransmission Timer), or an uplink on duration timer (On Duration Timer) configured in a DRX mechanism of the terminal device, or may be the duration of the valid subframe region carried in the first indication, or may be a newly defined or newly specified timer. This is not limited.

In some possible implementations, the monitoring a physical channel to obtain a second indication includes: stopping, by the terminal device, monitoring the physical channel if the terminal device obtains the second indication within the preset first time region.

Herein, the terminal device may stop monitoring the physical channel, for example, the PDCCH, after the second indication the monitored, thereby saving power of the terminal device.

In some possible implementations, the method further includes: performing, by the terminal device, the data transmission on the resource based on the first indication and the second indication if the terminal device obtains the second indication.

Herein, the resource may be a time domain location for the data transmission of the terminal device.

For example, the terminal device obtains the second indication, and the second indication includes the second uplink grant. The second uplink grant is mainly used to indicate the location of the first subframe in the valid subframe region (indicated in the first uplink grant) to the terminal device. The terminal device may determine, based on the location of the first subframe in the second uplink grant and the offset information of the first subframe in the first uplink grant, a subframe in which uplink transmission is to be performed, that is, determine a time domain resource for the terminal device to send data, so as to perform the data transmission.

In some possible implementations, the monitoring a physical channel within a preset first time region to obtain a second indication includes: starting or restarting, by the terminal device, a first timer, where duration of the first timer is duration of the preset first time region; and monitoring, by the terminal device, the physical channel during running of the first timer to obtain the second indication.

Optionally, the first timer may be any one of an inactivity timer DRX (Inactivity Timer), an on duration timer, and an uplink retransmission timer (DRX-UL Retransmission Timer). Alternatively, the first timer may be a newly introduced discontinuous reception DRX timer, or a MAC layer timer, or an RRC layer timer. This is not limited.

In this embodiment of the present application, the terminal device does not sleep during running of the first timer, unless the terminal device receives the second indication. Alternatively, it may be understood that the terminal device keeps monitoring the PDCCH during running of the first timer, until the second indication is received. Alternatively, it may be understood that the terminal device remains in a DRX active state during running of the first timer, so as to receive the second indication.

Optionally, an end time of the first timer may be set to be not later than a dead time of the valid subframe region indicated in the first uplink grant. It may be further understood that the duration of the first timer may be set to be greater than or equal to the duration of the valid subframe region.

Optionally, the duration of the first timer may be indicated by the network device by using the first uplink grant, or may be indicated by using higher layer signaling, for example, Radio Resource Control (RRC) signaling; or may be specified in a protocol. This is not limited. If the first uplink grant indicates the duration of the first timer, after obtaining the first uplink grant, the PHY layer of the terminal device needs to provide information about the duration of the first timer for the MAC layer of the terminal device.

In some possible implementations, the method further includes: stopping the first timer, if the first timer does not expire and/or does not stop when or after the second indication is obtained.

That "the first timer expires" means that the timer automatically stops after reaching a specified time. That "the first timer stops" means that the terminal device or a base station forcibly stops the timer without considering whether the timer reaches the specified time.

Herein, if the first timer does not expire and/or does not stop after the second indication or the second uplink grant is obtained, the terminal device stops the first timer. In this way, after receiving the second indication or the second uplink grant, the terminal device no longer needs to monitor the PDCCH, thereby saving power.

In some possible implementations, the starting or restarting, by the terminal device, a first timer includes: starting or restarting, by the terminal device, the first timer when or after obtaining the first indication.

A time or moment for starting the first timer may be determined based on the first indication (another appropriate form may be used, and this is not limited). The "when or after" herein means that the terminal device may start the first timer in a subframe in which the first uplink grant is obtained, or may start the first timer in a subframe following a subframe in which the first uplink grant is obtained. This is not limited. Therefore, in this embodiment of the present application, subframes for "obtaining the first indication" and "starting the first timer" are relatively flexible, and the first timer is not necessarily started or restarted in a fixed subframe.

In some possible implementations, the method further includes: if the terminal device does not obtain the second indication during running of the first timer, starting a second timer, where the second timer is used to wait for an uplink resource for retransmission.

Optionally, the second timer may be an uplink retransmission timer (DRX-UL Retransmission Timer).

In some possible implementations, the method further includes: starting, by the terminal device, a third timer when obtaining the first indication; and skipping, by the terminal device during running of the third timer, monitoring the physical channel; and the starting or restarting a first timer includes: starting or restarting the first timer when the third timer expires.

Therefore, the terminal device may start the third timer in the subframe in which the first uplink grant is received or after the first uplink grant is received, and during running of the third timer, the terminal device may not monitor the PDCCH. Alternatively, if the terminal device does not meet a DRX activation condition, the terminal device does not monitor the PDCCH within the third timer. In this way, the power of the terminal device can be saved.

In this embodiment of the present application, duration of the third timer may be configured by the network device based on capability information that is reported by the terminal device, or may be directly specified in a protocol. This is not limited.

Optionally, after the third timer is introduced, the duration of the first timer of the terminal device may be determined based on both the duration of the third timer and the duration of the valid subframe region.

In some possible implementations, the duration of the third timer may be indicated by the network device by using the first indication or Radio Resource Control (RRC) signaling.

In some possible implementations, when the terminal device obtains the first indication, if a fourth timer is running, the monitoring, by the terminal device, a physical channel within a preset first time region to obtain a second indication includes: monitoring, by the terminal device within an intersection time period that is determined between the preset first time region and a running time of the fourth timer, the physical channel to obtain the second indication.

The terminal device may monitor the physical channel within the intersection time period that is determined between the preset first time region and the running time of the fourth timer (for example, an uplink retransmission timer), to obtain the second indication.

In other words, in some possible implementations, for example, the method further includes: before the second indication is obtained, if the fourth timer is running, skipping stopping the fourth timer, where the fourth timer is within the preset first time region; and the monitoring a physical channel within a preset first time region to obtain a second indication includes: monitoring the physical channel during running of the fourth timer to obtain the second indication.

Optionally, the fourth timer may be any one of an inactivity timer (DRX Inactivity Timer), an on duration timer, an uplink retransmission timer (DRX-UL Retransmission Timer), and a newly introduced timer.

In this embodiment of the present application, the terminal device may not always or not necessarily introduce a timer. If a timer (for example, the DRX-UL Retransmission Timer) is currently running, the terminal device may directly use the currently running timer to monitor the PDCCH. In this way, to some extent, a resource is saved for the terminal device, because the terminal device uses the currently running timer and does not need to redefine a timer.

In some possible implementations, the method further includes: stopping, by the terminal device, the fourth timer if the terminal device obtains the second indication.

Similarly, if the fourth timer does not stop after the second indication is obtained, the terminal device may stop the fourth timer, thereby saving the power of the terminal device.

According to a second aspect, a data transmission method is provided. The method includes obtaining a first indication. The method also includes generating and/or obtaining first information of a first time, where the first information is reference information used by a network device to schedule a terminal device. The method also includes obtaining a second indication; and performing data transmission based on the first indication, the second indication, and the first information, where the first indication and the second indication are used by the terminal device to determine a resource for the data transmission.

In this embodiment of the present application, the terminal device obtains the first indication, and then generates the first information of the first time or directly obtains the first information of the first time, where the first information is the reference information used by the network device to schedule the terminal device; and then obtains the second indication, and performs the data transmission based on the first indication, the second indication, and the first information. In this way, a transport block in a two-level scheduling mode can be generated to perform the data transmission.

In this embodiment of the present application, the first time may be a specific moment, or may be a specific time period, for example, duration such as a subframe. This is not limited.

In this embodiment of the present application, the first information may be control information of a buffer status (BS) and/or power headroom (PH), or may be one or more MAC control elements (CE), or may be a transport block including a MAC CE; or the first information may be a control element for a buffer status report (BSR)/a power headroom report (PHR). This is not limited.

The BSR is used by the terminal device to notify the network device of an amount of to-be-sent data in an uplink buffer of the terminal device, so that the network device determines a quantity of uplink transmission resources needing to be allocated to the terminal device. The PHR is used by the terminal device to report power headroom information (namely, a difference between estimated power of a UL_SCH channel and maximum transmit power of UE) of each cell to the network device, so that the network device adjusts transmit power of the terminal device.

In this embodiment of the present application, usage of the first information is as follows. The network device may schedule an appropriate resource for the terminal device with reference to the first information, or adjust a related parameter of the terminal device with reference to the first information. For example, the network device may determine, based on the BSR in the first information, an appropriate transmission resource to be allocated to the terminal device. For another example, the network device may learn power headroom information of each cell based on the PHR in the first information, to adjust transmit power of the terminal device.

It should be understood that the first information may be used as a proper reference for assisting the network device in performing scheduling for the terminal device, but the eference may be not limited to the first information.

It needs to be noted that, in this embodiment of the present application, generating or obtaining the "first information" and obtaining the "second indication" are not necessarily performed in a strict order of time. For example, the "first information" is generated or obtained before the "second indication" is obtained; or the "first information" is generated or obtained after the "second indication" is obtained. This is not limited.

In some possible implementations, the first indication includes second time indication information, and the second indication includes third time indication information; and the performing data transmission based on the first indication, the second indication, and the first information includes: determining, based on the second time indication information and the third time indication information, a time domain location used to transmit data, and performing the data transmission based on the first information.

In this embodiment of the present application, the "second time indication information" and the "third time indication information" are introduced only for ease of description, to distinguish from the foregoing "first time", and numbers have no special meaning and do not constitute any limitation on the present application.

In this embodiment of the present application, the second time indication information may be specifically offset information of a first subframe in a first uplink grant, and the third time indication information may be specifically a location of the first subframe in a second uplink grant.

The terminal device may determine, based on the second time indication information (for example, the offset information of the first subframe in the first uplink grant) and the third time indication information (the location of the first subframe in the second uplink grant), the time domain location used to transmit data (that is, determine a subframe in which uplink transmission is to be performed). The terminal device performs the data transmission based on the first information (for example, a data packet or a MAC CE) and the time domain location.

In some possible implementations, the generating and/or obtaining first information of a first time includes: determining, by a Media Access Control (MAC) layer of the terminal device, a buffer status BS of the terminal device based on the first time, where the first information includes the BS of the terminal device.

In some possible implementations, the generating and/or obtaining first information of a first time includes: determining, by a physical (PHY) layer of the terminal device, power headroom (PH) of each active serving cell based on the first time, and notifying the MAC layer of the terminal device of PH of the terminal device, where the first information includes the PH of the terminal device.

Optionally, if a previous transport block of the terminal device has not yet been successfully sent, when a current transport block is generated, a data amount of the previously generated transport block may be considered or not considered. This is not limited.

For example, the Media Access Control (MAC) layer of the terminal device obtains the first uplink grant and the second uplink grant that are sent by the physical (PHY) layer of the terminal device; and the MAC layer of the terminal device determines at least one of a buffer status parameter and/or a power headroom parameter based on a subframe that is indicated in the first uplink grant and the second uplink grant.

For example, optionally, in an embodiment, the physical (PHY) layer of the terminal device notifies the Media Access Control layer (MAC) layer of the terminal device of the obtained first uplink grant; and the MAC layer of the terminal device determines a reference subframe based on the first uplink grant. The reference subframe may be the same as or different from a subframe that is used by the terminal device to perform the data transmission. The subframe for the data transmission may be determined based on both the first uplink grant and the second uplink grant, or the second uplink grant only. The MAC layer of the terminal device determines the BSR and/or the PHR based on the reference subframe.

Herein, for the PHR, the physical layer of the terminal calculates the power headroom of each active serving cell based on the reference subframe, and notifies the MAC layer of the terminal device of the power headroom, to generate a PHR MAC CE. For the PHR, the MAC layer of the terminal calculates a buffer status based on the reference subframe, to generate a BSR MAC CE. The reference subframe is different from the subframe that is used by the terminal device to perform the data transmission. For example, duration from a location of the reference subframe to a subframe in which the first uplink grant is received may be at least four subframes.

Optionally, the location of the reference subframe may be specified in a protocol, or may be indicated by a base station. This is not limited.

In some possible implementations, the method further includes: associating, by the Media Access Control (MAC) layer of the terminal device, with a hybrid automatic repeat request (HARQ) module based on the first time, and storing the first information into the HARQ module, so that the PHY layer of the terminal device transmits the first information.

For example, after receiving the first indication, the PHY layer of the terminal device instructs the MAC layer of the terminal device to perform a packet assembly process. A MAC Link Control Protocol (LCP) module layer of the terminal device generates the first information, such as a data packet, of the first time (a subframe or a moment), sends the data packet to the HARQ module, and instructs the PHY layer of the terminal device to perform the data transmission. The PHY layer of the terminal device completes the data transmission in the two-level scheduling mode based on the data packet.

In this embodiment of the present application, when receiving the second uplink grant, the MAC layer of the terminal device may transfer the generated data packet to the HARQ module; or may directly transfer the data packet to the HARQ module without considering whether the second uplink grant is received. When not considering whether the second uplink grant is received, the terminal device may process a HARQ process using a reference transmission time interval (TTI); or, optionally, when the second uplink grant is not received, the MAC layer of the terminal device may roll the generated data packet back to a Radio Link Control (RLC) layer, to wait for an uplink resource of any serving cell for a next time. This is not limited.

In some possible implementations, before the obtaining a first indication, the method further includes: triggering, by the terminal device, reporting of the first information.

In some possible implementations, the method further includes: canceling all triggered reporting of the first information if the MAC layer of the terminal device does not receive the second indication.

Specifically, if the MAC layer of the terminal device does not receive the second indication (for example, the second uplink grant), all triggered reporting of the first information may be canceled.

Optionally, for example, the physical (PHY) layer of the terminal device notifies the Media Access Control (MAC) layer of the terminal device of the first uplink grant (included in the first indication) of the terminal device. If the MAC layer of the terminal device obtains the first uplink grant (or learns that an uplink grant is the two-level scheduling mode), after a transport block including the BSR and/or the PHR is generated, the BSR and/or the PHR triggered by the MAC layer of the terminal device based on the first uplink grant may be not canceled.

Optionally, in this embodiment of the present application, after the two-level scheduling mode is introduced, the PHY layer of the terminal device may calculate channel state information (CSI). Specifically, after receiving the second uplink grant, the terminal device may use the subframe indicated in the second uplink grant as a subframe for calculating the CSI, or may select an available downlink subframe that is closest to the subframe indicated in the second uplink grant as a subframe for calculating the CSI, or may select another appropriate reference subframe. This is not limited.

Optionally, in this embodiment of the present application, when the terminal device performs the data transmission after receiving the second uplink grant, if power is limited, the terminal device may perform power back-off, or the terminal device may give up uplink transmission of two-level scheduling. This is not limited.

According to a third aspect, a terminal device is provided. The terminal device is configured to perform the method in the first aspect or any possible implementation of the first aspect. Specifically, the terminal device includes a unit configured to perform the method in the first aspect or any possible implementation of the first aspect.

According to a fourth aspect, a terminal device is provided. The terminal device is configured to perform the method in the second aspect or any possible implementation of the second aspect. Specifically, the apparatus includes a unit configured to perform the method in the second aspect or any possible implementation of the second aspect.

According to a fifth aspect, a terminal device is provided. The terminal device includes a processor, a memory, and a communications interface. The processor is connected to the memory and the communications interface. The memory is configured to store an instruction. The processor is configured to execute the instruction. The communications interface is configured to communicate with another network element under control of the processor. When the processor executes the instruction stored in the memory, the execution enables the processor to perform the method in the first aspect or any possible implementation of the first aspect.

According to a sixth aspect, a terminal device is provided. The terminal device includes a processor, a memory, and a communications interface. The processor is connected to the memory and the communications interface. The memory is configured to store an instruction. The processor is configured to execute the instruction. The communications interface is configured to communicate with another network element under control of the processor. When the processor executes the instruction stored in the memory, the execution enables the processor to perform the method in the second aspect or any possible implementation of the second aspect.

According to a seventh aspect, a computer readable storage medium is provided. The computer readable storage medium stores a program, and the program enables a terminal device to perform the data transmission method in any one of the first aspect or the implementations of the first aspect.

According to an eighth aspect, a computer readable storage medium is provided. The computer readable storage medium stores a program, and the program enables a terminal device to perform the data transmission method in any one of the second aspect or the implementations of the second aspect.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

Figure 1A:
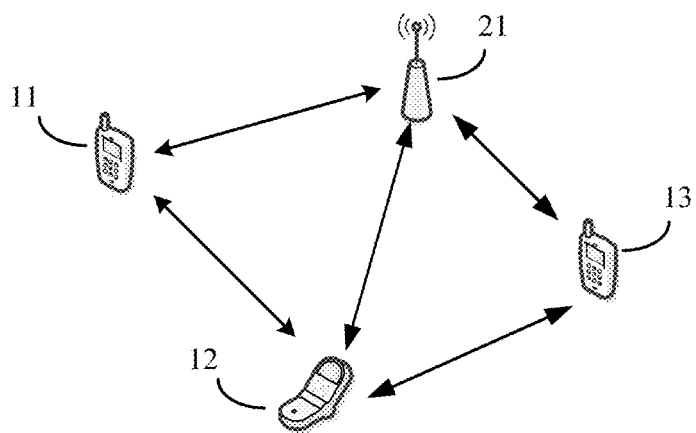
FIG. 1A is a schematic diagram of an application scenario.

It should be understood that the technical solutions in the embodiments of the present application may be applied to various communications systems using an LAA mechanism, for example, a Global System for Mobile Communications (GSM), a Code Division Multiple Access (CDMA) system, a Wideband Code Division Multiple Access (WCDMA) system, a Long Term Evolution (LTE) system, an LTE frequency division duplex (FDD) system, an LTE time division duplex (TDD) system, a Universal Mobile Telecommunications System (UMTS), and a future 5G communications system.

It should also be understood that, in the embodiments of the present application, a terminal device may communicate with one or more core networks by using a radio access network ("RAN" for short). The terminal device may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus. The user device may be a cellular phone, a cordless telephone set, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, or a terminal device in a future 5G network.

It should also be understood that, in the embodiments of the present application, a network device may be configured to communicate with the user device, and the network device may be a base transceiver station (BTS) in the GSM system or the CDMA system, or may be a NodeB (NB) in the WCDMA system, or may be an evolved NodeB (eNB or eNodeB) in the LTE system; or the network device may be a relay station, an access point, an in-vehicle device, a wearable device, a base station device in the future 5G network, or the like.

It should also be understood that the embodiments of the present application may be applied to a licensed-carrier-assisted access system. To be specific, UE accesses an unlicensed carrier with assistance of a licensed carrier. The system does not support access to an unlicensed carrier alone. In the system, an unlicensed carrier may be accessed using an LBT mechanism, and duration for each access to the unlicensed carrier is limited. In the embodiments of the present application, the system is referred to as a licensed-assisted access (LAA) system, but the system may alternatively have another name. This is not limited in the embodiments of the present application.

A network device (for example, a base station or a base station controller) and a terminal device in a cellular network may communicate using a licensed carrier or an unlicensed carrier. Before performing data transmission using an unlicensed carrier, the network device or the terminal device may contend, with a node in a wireless local area network (WLAN) or another LAA node that uses the LAA mechanism in the cellular network, for a resource on the unlicensed carrier, and after obtaining a resource through the contention, perform the data transmission using the resource obtained through the contention. The user device or the network device may contend for a channel in an LBE manner or an FBE manner. This is not limited in the embodiments of the present application.

FIG. 1A is a schematic diagram of a scenario. It should be understood that, for ease of understanding, the scenario in FIG. 1A is introduced herein as an example for description, but does not constitute any limitation on the present application. FIG. 1A shows a terminal device 11, a terminal device 12, a terminal device 13, and a base station 21.

As shown in FIG. 1A, the terminal device 11 may communicate with the base station 21, the terminal device 12 may communicate with the base station 21, and the terminal device 13 communicates with the base station 21. Alternatively, the terminal device 12 may also communicate with the terminal device 11. Alternatively, in another case, the terminal device 13 communicates with the terminal device 12. The terminal devices and the base station in FIG. 1A may be applied to an LAA system.

Figure 1B:
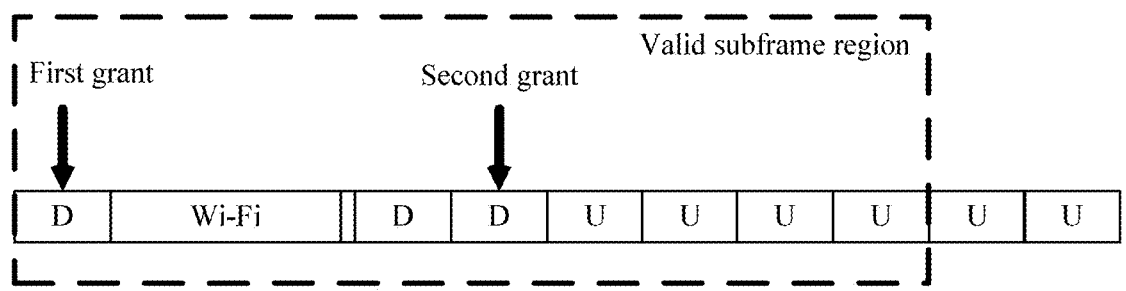
FIG. 1B is a schematic diagram of two-level scheduling according to an embodiment of the present application.

The following describes some related concepts or terms in the embodiments of the present application with reference to FIG. 1B. For the LAA system, the 3GPP introduces a two-level scheduling mode. FIG. 1B is a schematic structural diagram of a subframe in the two-level scheduling mode in the LAA system.

As shown in FIG. 1B, when performing uplink transmission, a terminal device (for example, any terminal device shown in FIG. 1A) needs to obtain a two-level uplink grant (UL grant), namely, a first uplink grant (for example, an initial uplink grant (initial UL grant)) and a second uplink grant (for example, a triggered uplink grant (triggered UL grant)) in FIG. 1B. The terminal device can perform data transmission only after receiving the uplink grants of two-level scheduling. A subframe in the dashed-line box represents a valid subframe region indicated in the first uplink grant.

Specifically, a first-level uplink grant (briefly referred to as the first uplink grant) is mainly used to indicate a frequency domain resource for uplink transmission of the terminal device, modulation and coding scheme (MCS) information, subframe offset information of a first subframe, and the valid subframe region for the uplink transmission. Optionally, the first uplink grant may also include information such as a HARQ process identifier (ID). The first uplink grant may schedule at least one subframe, to perform uplink transmission in each subframe, where a different HARQ process is used in each transmission. The first uplink grant may be notified by a base station to the terminal device using a physical downlink control channel (PDCCH), and may be scrambled using a cell radio network temporary identifier (C-RNTI). The "first subframe" is introduced for ease of description. The first subframe may be any subframe, for example, a start uplink subframe. This is not limited.

In addition, a second-level uplink grant (briefly referred to as the second uplink grant) is mainly used to indicate a location of the first subframe in the valid subframe region (indicated in the first uplink grant) to the terminal device. The terminal device may determine, based on the location of the first subframe in the second-level uplink grant and the offset information of the first subframe in the first-level uplink grant, one or more subframes in which uplink transmission is to be performed one or more times, that is, determine a time domain resource for the terminal device to send data. The second uplink grant may be notified by the base station to the terminal device using a dedicated PDCCH or a common PDCCH. The dedicated PDCCH is scrambled using a C-RNTI. The common PDCCH is scrambled using a common cell radio network temporary identifier (CC-RNTI).

For example, if the first uplink grant indicates that the subframe offset information of the first subframe is 2, and the second uplink grant indicates that the first subframe is a subframe k (k is a subframe number), a number of a subframe used by the terminal device to perform data transmission is k+2.

To obtain the first uplink grant and the second uplink grant, the terminal device needs to monitor the PDCCH. In the current system, the terminal device may fail to monitor the second uplink grant. In the current system, an issue about whether to introduce a DRX mechanism in two-level scheduling is not discussed. Even though the DRX mechanism is configured for the terminal device, because the DRX mechanism has an active period and a dormant period, the terminal device can only discontinuously monitor the PDCCH. It cannot be ensured that the second uplink grant can be certainly monitored, resulting in a failure to complete data transmission in the two-level scheduling mode. In addition, if the terminal device operates a plurality of times based on the active period and the dormant period of the DRX mechanism, a large amount of power of the terminal device is consumed. Based on this, the present application attempts to introduce a time region or set a timer to monitor the PDCCH in the two-level scheduling mode, to ensure that the terminal device completes data transmission in the two-level scheduling mode. Further, the power of the terminal device can be saved, and some unnecessary monitoring can be reduced.

Figure 2:
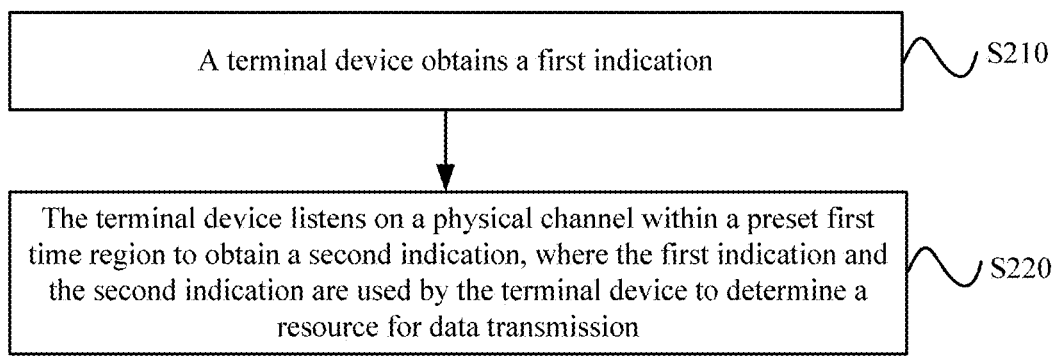
FIG. 2 is a schematic flowchart of a data transmission method according to an embodiment of the present application.

FIG. 2 is a schematic flowchart of a data transmission method according to an embodiment of the present application. The method may be performed by a terminal device, for example, any terminal device shown in FIG. 1A. The method 200 includes the following steps.

S210. The terminal device obtains a first indication.

In this embodiment of the present application, the first indication may be understood as an uplink transmission resource, and may be specifically understood as a first uplink grant; or, optionally, the first indication may include a first uplink grant and an uplink resource.

Optionally, the first indication may further indicate that each uplink transmission of the terminal device is initial transmission or retransmission.

Optionally, the first uplink grant includes subframe offset information of a first subframe. For example, in a two-level scheduling mode, the first uplink grant may indicate duration of a valid subframe region to be used by the terminal device to perform data transmission. The first uplink grant indicates an uplink transmission resource (for example, a frequency domain resource).

Optionally, the first uplink grant may further include related information used to indicate one or more times of uplink transmission of the terminal device, for example, hybrid automatic repeat request (HARQ) process identifier (ID) information used in each uplink transmission, and MCS information. Optionally, the first uplink grant may further indicate that each uplink transmission is initial transmission or retransmission.

Optionally, a physical layer of the terminal device may notify a MAC layer of the terminal device of information about the first uplink grant.

Optionally, the first indication or the first uplink grant may be sent by a network device and received by the terminal device. Optionally, the first indication or the first uplink grant may be sent by the network device to the terminal device using a PDCCH.

S220. The terminal device monitors a physical channel within a preset first time region to obtain a second indication.

The first indication and the second indication are used by the terminal device to determine a resource for data transmission.

Herein, the resource may be a time domain location for the data transmission of the terminal device.

Similarly, optionally, the second indication may be understood as a second uplink grant, or may be understood as an uplink transmission resource. Optionally, the second indication may include a second uplink grant and an uplink resource.

Optionally, the first indication may further include information about a range of the preset first time region. For example, the information about the range of the first time region may be duration of a valid subframe region.

Optionally, in this embodiment of the present application, the physical channel may be a PDCCH.

Optionally, in this embodiment of the present application, the terminal may not need to keep monitoring the physical channel throughout the preset first time region. Alternatively, it may be understood that the terminal may not need to keep monitoring throughout the preset first time region. Alternatively, it may be understood that the terminal may selectively stop monitoring the physical channel after any time point or any time period within the preset first time region. In other words, the preset first time region does not mean that the terminal device needs to keep monitoring the physical channel throughout the preset first time region, and the terminal device may stop monitoring if the second indication is monitored. In other words, the first time region is set to enable the terminal device to monitor the second indication, instead of emphasizing that the terminal device needs to strictly perform continuous monitoring within a time of the preset first time region. For example, when receiving the second indication, the terminal device may stop monitoring the physical channel.

Optionally, the second indication or the second uplink grant may be sent by the network device and received by the terminal device.

Optionally, the second indication or the second uplink grant may be sent by the network device to the terminal device using a PDCCH. Optionally, the preset first time region may be preset or preconfigured duration, for example, may be configured by a base station, or specified in a protocol. This is not limited.

Specifically, the terminal device may monitor the physical downlink control channel PDCCH within the preset first time region to obtain the second indication, so as to perform the data transmission based on the first indication and the second indication. The preset first time region may be implemented by a timer (for example, a DRX Inactivity Timer, or a DRX UL Retransmission Timer, or an On Duration Timer) configured in a DRX mechanism of the terminal device, or may be implemented by the duration of the valid subframe region carried in the first indication, or may be implemented by a newly defined or newly specified timer. This is not limited.

Optionally, the first indication includes the information about the range of the preset first time region. Specifically, the information about the range of the first time region may be specified in a protocol, or may be configured by a network device and then notified to the terminal device by using the first indication. This is not limited.

In this embodiment of the present application, optionally, for example, the first indication may indicate relative time information (for example, the offset information of the first subframe) of the terminal device, and the second indication may indicate absolute time information (a location of the first subframe) of the terminal device. The terminal device may determine, based on the first indication and the second indication, one or more subframes in which transmission is to be performed one or more times, that is, determine a time domain resource for sending data. The "first subframe" is introduced for ease of description. The first subframe may be any subframe, for example, a start uplink subframe. This is not limited.

In this embodiment of the present application, the terminal device certainly does not sleep within the preset first time region, unless the terminal device receives the second indication and/or the first indication is invalid. Alternatively, it may be understood that the terminal device continuously monitors the PDCCH within the preset first time region, until the second indication is received and/or the first indication is invalid. Alternatively, it may be understood that the terminal device remains in a DRX active state within the preset first time region, until the second indication is received and/or the first indication is invalid. That "the first indication is invalid" may be specifically understood as that a current subframe goes beyond a valid time or subframe region indicated in the first indication, and does not fall within the valid time or subframe region.

Therefore, in the data transmission method in this embodiment of the present application, the terminal device obtains the first indication, and monitors the physical channel within the preset first time region to obtain the second indication, where the first indication and the second indication are used by the terminal device to determine the resource for the data transmission. It can be ensured that the terminal device obtains the second indication, so as to complete the data transmission in the two-level scheduling mode.

Optionally, in the data transmission method in this embodiment of the present application, the terminal device obtains the first indication, and monitors the physical channel within the preset first time region to obtain the second indication, where the second indication is used to generate a MAC service data unit (SDU) or a MAC protocol data unit (PDU), and the second indication is used by the terminal device to determine the time domain location for the data transmission. It can be ensured that the terminal device obtains the second indication, so as to complete the related data transmission in the two-level scheduling mode.

Optionally, S220 includes: stopping, by the terminal device, monitoring the physical channel if the second indication is obtained within the preset first time region.

Specifically, if the terminal device obtains the second indication within the preset first time region, the terminal device may stop monitoring the physical channel, for example, the PDCCH. Therefore, the terminal device stops monitoring the physical channel after the second indication is monitored, thereby saving power of the terminal device.

For example, optionally, in an embodiment, S220 may include: starting or restarting a first timer, where duration of the first timer is indicated by the network device; and the monitoring a physical channel within a preset first time region to obtain a second indication includes: monitoring the physical channel during running of the first timer to obtain the second indication.

Specifically, the terminal device may introduce the first timer, start or restart the first timer, and monitor the PDCCH during running of the first timer to obtain the second indication. Therefore, in this embodiment of the present application, by introducing the first timer, the terminal device can receive the second indication within the first timer. Compared with a time region represented by the "preset first time region", an expression form of the first timer is more specific, so that the terminal device can pertinently receive the second indication within the first timer, to perform the data transmission based on the first indication and the second indication.

Optionally, the starting or restarting a first timer may include: starting or restarting the first timer when or after the first indication is obtained.

Specifically, the terminal device may start or restart the first timer when or after obtaining the first indication or the first uplink grant. In other words, a time or moment for starting the first timer may be determined based on the first indication (certainly, another appropriate form may be used, and this is not limited). The "when or after" herein means that the terminal device may start the first timer in a subframe in which the first uplink grant is obtained, or may start the first timer in a subframe following a subframe in which the first uplink grant is obtained. This is not limited. Therefore, in this embodiment of the present application, subframes for "obtaining the first indication" and "starting the first timer" are relatively flexible, and the first timer is not necessarily started or restarted in a fixed subframe.

Optionally, an end time of the first timer may be set to be not later than a dead time of the valid subframe region indicated in the first uplink grant. It may be further understood that the duration of the first timer may be set to be greater than or equal to the duration of the valid subframe region.

In this embodiment of the present application, the terminal device certainly does not sleep during running of the first timer, unless the terminal device receives the second indication and/or the first indication is invalid. Alternatively, it may be understood that the terminal device continuously monitors the PDCCH during running of the first timer, until the second indication is received and/or the first indication is invalid. Alternatively, it may be understood that the terminal device remains in the DRX active state during running of the first timer, until the second indication is received and/or the first indication is invalid.

Optionally, the duration of the first timer may be indicated by the network device by using the first uplink grant, or may be indicated using higher layer signaling, for example, Radio Resource Control (RRC) signaling; or may be specified in a protocol. This is not limited. If the first uplink grant indicates the duration of the first timer, after obtaining the first uplink grant, the PHY layer of the terminal device needs to provide information about the duration of the first timer for the MAC layer of the terminal device.

Optionally, the first timer may be any one of a DRX Inactivity Timer, an On Duration Timer, and a DRX-UL Retransmission Timer. Alternatively, the first timer may be a newly introduced discontinuous reception DRX timer, or a MAC layer timer, or an RRC layer timer. This is not limited.

For example, the first timer may be configured based on an asynchronous uplink (UL) HARQ process, that is, the first timer may be understood as a first timer maintained for an asynchronous UL HARQ; or the first timer is configured based on a first uplink grant, and may be understood as a first timer maintained for the first uplink grant; or the first timer is configured based on a MAC layer, and may be understood as a first timer maintained for the MAC layer. This is not limited.

Optionally, the first timer may be a period of time specified by the terminal device; or, optionally, the first timer may be a DRX active period. For example, if the DRX mechanism is configured for the terminal device, the terminal device may remain in the DRX active state, and directly monitor the PDCCH by using the DRX active period.

For example, the terminal device may monitor the PDCCH based on an On Duration Timer and/or a DRX Inactivity Timer (discontinuous reception inactivity timer) in the DRX mechanism. The On Duration Timer means a quantity of subframes in which the terminal device needs to monitor the PDCCH in each DRX period. The terminal device needs to start the On Duration Timer when each new DRX period starts. The DRX Inactivity Timer indicates a time period. The terminal device needs to continuously monitor the PDCCH within the time period, and the terminal device obtains initially transmitted data (which does not include retransmitted data) through demodulation within the time period. After receiving another indication of initially transmitted data, the terminal device may further restart the DRX Inactivity Timer. In addition, an uplink retransmission timer (namely, the discontinuous reception uplink retransmission timer (DRX-UL Retransmission Timer)) in the DRX mechanism may also be used to monitor the PDCCH.

Optionally, the first uplink grant may indicate initial transmission or retransmission.

In an embodiment, for example, when the first timer is the parameter DRX Inactivity Timer in the DRX mechanism, when or after the first uplink grant indicating initial transmission or retransmission is monitored or obtained, the terminal device may start or restart the DRX Inactivity Timer, stop the DRX-UL Retransmission Timer, monitor the PDCCH within the DRX Inactivity Timer to obtain the second uplink grant, and perform the data transmission based on the first uplink grant and the second uplink grant. Optionally, after sending data, the terminal device may start an uplink hybrid automatic repeat request round trip time timer (UL HARQ RTT Timer), and may restart the DRX-UL Retransmission Timer if the UL HARQ RTT Timer expires.

In an embodiment, for example, when the first timer is the parameter DRX-UL Retransmission Timer in the DRX mechanism, when or after the first uplink grant indicating initial transmission or retransmission is monitored or obtained, the terminal device may start or restart the DRX-UL Retransmission Timer, monitor the PDCCH within the DRX-UL Retransmission Timer to obtain the second uplink grant, and perform the data transmission based on the first uplink grant and the second uplink grant. Optionally, after sending data, the terminal device may start a UL HARQ RTT Timer, and may restart the DRX-UL Retransmission Timer if the UL HARQ RTT Timer expires.

In an embodiment, for example, when the first timer is the parameter DRX On Duration Timer in the DRX mechanism, when or after the first uplink grant indicating initial transmission or retransmission is monitored or obtained, the terminal device may start or restart the DRX On Duration Timer, stop the DRX-UL Retransmission Timer, monitor the PDCCH within the DRX On Duration Timer to obtain the second uplink grant, and perform the data transmission based on the first uplink grant and the second uplink grant. Optionally, after sending data, the terminal device may start a UL HARQ RTT Timer, and may restart the DRX-UL Retransmission Timer if the UL HARQ RTT Timer expires.

In an embodiment, for example, when the first timer is a parameter trigger timer (DRX Trigger Timer) in the DRX mechanism, when or after the first uplink grant indicating initial transmission or retransmission is monitored or obtained, the terminal device may start or restart the DRX Trigger Timer, stop the DRX-UL Retransmission Timer, monitor the PDCCH within the DRX Trigger Timer to obtain the second uplink grant, and perform the data transmission based on the first uplink grant and the second uplink grant. Optionally, after sending data, the terminal device may start a UL HARQ RTT Timer, and may restart the DRX-UL Retransmission Timer if the UL HARQ RTT Timer expires. The DRX Trigger Timer is a newly configured or newly introduced DRX timer.

In this embodiment of the present application, for each uplink transmission, the terminal device starts a corresponding UL HARQ RTT Timer. Each uplink transmission corresponds to one HARQ process, and each HARQ process has a group of DRX-UL Retransmission Timer and UL HARQ RTT Timer.

Therefore, in the data transmission method in this embodiment of the present application, the terminal device obtains the first indication, and listens on the physical channel within the preset first time region to obtain the second indication, where the first indication and the second indication are used by the terminal device to determine the resource for the data transmission. It can be ensured that the terminal device obtains the second indication, so as to complete the data transmission in the two-level scheduling mode and further save the power of the terminal device.

Optionally, in this embodiment of the present application, the method 200 further includes: performing the data transmission based on the first indication and the second indication if the second indication is obtained.

Specifically, the terminal device may monitor the PDCCH within the preset first time region (for example, within the first timer) to obtain the second indication sent by the network device. The second indication includes the second uplink grant. The second uplink grant is mainly used to indicate the location of the first subframe in the valid subframe region (indicated in the first uplink grant) to the terminal device. The terminal device may determine, based on the location of the first subframe in the second uplink grant and the offset information of the first subframe in the first uplink grant, a subframe in which uplink transmission is to be performed, that is, determine a time domain resource for the terminal device to send data, so as to perform the data transmission.

In other words, the terminal device obtains the first uplink grant. The first uplink grant includes information used to indicate the valid subframe region for the data transmission, and the offset information of the first subframe. Then the terminal device starts the first timer, and listens on the PDCCH within the first timer to obtain the second uplink grant. The second uplink grant is used to indicate the location of the first subframe in the valid subframe region. Finally, after obtaining the second uplink grant, the terminal device determines, based on the first uplink grant and the second uplink grant, a location of a subframe for sending data, and performs data transmission one or more times, so as to complete the data transmission in the two-level scheduling mode.

Optionally, the method 200 further includes: stopping the first timer, if the first timer does not expire and/or does not stop when or after the second indication is obtained.

Herein, that "the first timer expires" means that the timer automatically stops after reaching a specified time. That "the first timer stops" means that the terminal device or the base station forcibly stops the timer without considering whether the timer reaches the specified time.

Specifically, if the first timer does not expire and/or does not stop after the second indication or the second uplink grant is obtained, the terminal device stops the first timer. In this way, after receiving the second indication or the second uplink grant, the terminal device no longer needs to monitor the PDCCH, thereby saving power.

It should be understood that, in this embodiment of the present application, numbers "first, second . . . " are introduced only for ease of description, to distinguish between different objects, for example, distinguish between different "uplink grants", or distinguish between different "timers", or distinguish between different "indications", but do not constitute any limitation on the present application.

It should be further understood that sequence numbers of the foregoing processes do not mean priorities of execution sequences in this embodiment of the present application. The execution sequences of the processes should be determined based on functions and internal logic of the processes, but should not be construed as any limitation on the implementation processes of this embodiment of the present application.

Therefore, in the data transmission method in this embodiment of the present application, the terminal device obtains the first indication, and listens on the physical channel within the preset first time region to obtain the second indication, where the first indication and the second indication are used by the terminal device to determine the resource for the data transmission. It can be ensured that the terminal device obtains the second indication, so as to complete the data transmission in the two-level scheduling mode.

Optionally, in an embodiment, if the terminal device does not obtain the second indication during running of the first timer, the method 200 further includes: starting, by the terminal device, a second timer, where the second timer is used by the terminal device to wait for an uplink resource for retransmission; or starting a second timer, if the second indication is not obtained after the first timer expires and/or stops, where the second timer is used by the terminal to wait for an uplink resource for retransmission.

Specifically, after the first timer expires or stops, if the terminal device still does not receive the second indication (for example, the second uplink grant), the terminal device starts the second timer. The second timer may be used to wait for a possible uplink grant resource. Optionally, the second timer may be an uplink retransmission timer (DRX-UL Retransmission Timer).

Optionally, in an embodiment, the method 200 further includes: starting a third timer when or after the first indication is received; and skipping monitoring the physical channel before the third timer does not expire and/or does not stop; and S220 includes: starting or restarting the first timer after the third timer expires and/or stops.

Specifically, the terminal device may start the third timer in the subframe in which the first uplink grant is received or after the first uplink grant is received, and during running of the third timer, the terminal device may not monitor the PDCCH. Alternatively, if the terminal device does not meet a DRX activation condition, the terminal device does not monitor the PDCCH within the third timer. In this way, the power of the terminal device can be saved.

In this embodiment of the present application, duration of the third timer may be configured by the network device based on capability information that is reported by the terminal device, or may be directly specified in a protocol. This is not limited.

Optionally, after the third timer is introduced, the duration of the first timer of the terminal device may be determined based on both the duration of the third timer and the duration of the valid subframe region.

Therefore, in the data transmission method in this embodiment of the present application, the terminal device obtains the first indication, and listens on the physical channel within the preset first time region to obtain the second indication, where the first indication and the second indication are used by the terminal device to determine the resource for the data transmission. It can be ensured that the terminal device obtains the second indication, so as to complete the data transmission in the two-level scheduling mode and further save the power of the terminal device.

Optionally, in an embodiment, the method 200 may further include: when the terminal device obtains the first indication, if a fourth timer is running, listening, by the terminal device within an intersection time period that is determined between the preset first time region and a running time of the fourth timer, on the physical channel to obtain the second indication; or before the second indication is obtained, if a fourth timer is running, skipping stopping the fourth timer; and the monitoring a physical channel within a preset first time region to obtain a second indication includes: monitoring the physical channel during running of the fourth timer to obtain the second indication.

Specifically, before the terminal device obtains the second indication, if a timer (for example, the fourth timer) is already running, the terminal device may choose not to stop the fourth timer. The terminal device may monitor the PDCCH during running of the fourth timer to obtain the second indication. In other words, in this embodiment of the present application, the terminal device may not always or not necessarily introduce a timer. If a timer is currently running, the terminal device may directly use the currently running timer to monitor the PDCCH. In this way, to some extent, a resource is saved for the terminal device, because the terminal device uses the currently running timer and does not need to redefine a timer.

In this embodiment, information about the preset first time region, for example, information about the valid subframe region, is indicated in the first indication. The running time of the fourth timer may include only a part of the preset first time region, or may include the entire preset first time region. The terminal listens on the physical channel based on an intersection time region (referred to as, for example, a "second time region") that is determined between the running time of the fourth timer and the preset first time region.

Optionally, in this embodiment of the present application, the terminal may not need to keep monitoring the physical channel throughout the second time region. It may be further understood that the terminal may not need to keep listening throughout the second time region. Alternatively, it may be understood that the terminal may selectively stop monitoring the physical channel after any time point or any time period within the second time region. In other words, the second time region does not mean that the terminal device needs to keep monitoring the physical channel throughout the second time region, and the terminal device may stop listening if the second indication is monitored. In other words, the second time region is introduced to enable the terminal device to monitor the second indication, instead of emphasizing that the terminal device needs to strictly perform continuous listening within a time of the second time region. For example, when receiving the second indication, the terminal device may stop monitoring the physical channel. In addition, beyond the second time region, the terminal device may monitor the physical channel or may not monitor the physical channel. No requirement is set thereto.

Optionally, the method further includes: stopping, by the terminal device, the fourth timer if the terminal device obtains the second indication; or stopping the fourth timer, if the fourth timer does not expire and/or does not stop when or after the second indication is obtained.

Similarly, if the fourth timer does not stop after the second indication is obtained, the terminal device may stop the fourth timer, thereby saving the power of the terminal device.

Optionally, the method may further include: stopping the fourth timer, if the fourth timer does not expire and/or does not stop when the first indication is invalid.

Specifically, when the valid subframe region indicated in the first indication is invalid, or in other words, when the valid subframe region is outrun, if the fourth timer is still running, the terminal device may choose to stop the fourth timer (it may be understood that, if the valid subframe region is already invalid, it is meaningless to continue to monitor the PDCCH, and in this case, the fourth timer may be stopped). A dead time of the first indication is determined by the valid subframe region in the first indication.

Optionally, the fourth timer may be any one of a DRX Inactivity Timer, an On Duration Timer, and a DRX-UL Retransmission Timer. Alternatively, the fourth timer may be a newly introduced discontinuous reception DRX timer, or a MAC layer timer, or an RRC layer timer.

In an embodiment, for example, if the fourth timer is an uplink retransmission timer, for example, the DRX-UL Retransmission Timer, a data transmission process of the terminal device is specifically as follows. The terminal device obtains the first uplink grant by monitoring the PDCCH; when the first uplink grant instructs the terminal device to perform retransmission or initial transmission, the terminal device does not stop the DRX-UL Retransmission Timer, and the terminal device may monitor the PDCCH during running of the DRX-UL Retransmission Timer to obtain the second uplink grant; and after receiving the second uplink grant, the terminal device stops the DRX-UL Retransmission Timer. Optionally, if the terminal device does not receive the second uplink grant before the first uplink grant is invalid or after the DRX-UL Retransmission Timer expires, the terminal device may start or restart the DRX-UL Retransmission Timer and/or a DRX-inactive Timer. Optionally, after performing the data transmission based on the first uplink grant and the second uplink grant, the terminal device may start a UL HARQ RTT Timer, and may restart the DRX-UL Retransmission Timer after the UL HARQ RTT Timer expires. This is not limited.

Therefore, in the data transmission method in this embodiment of the present application, the terminal device obtains the first indication, and listens on the physical channel within the preset first time region to obtain the second indication, where the first indication and the second indication are used by the terminal device to determine the resource for the data transmission. It can be ensured that the terminal device obtains the second indication, so as to complete the data transmission in the two-level scheduling mode.

Figure 3:
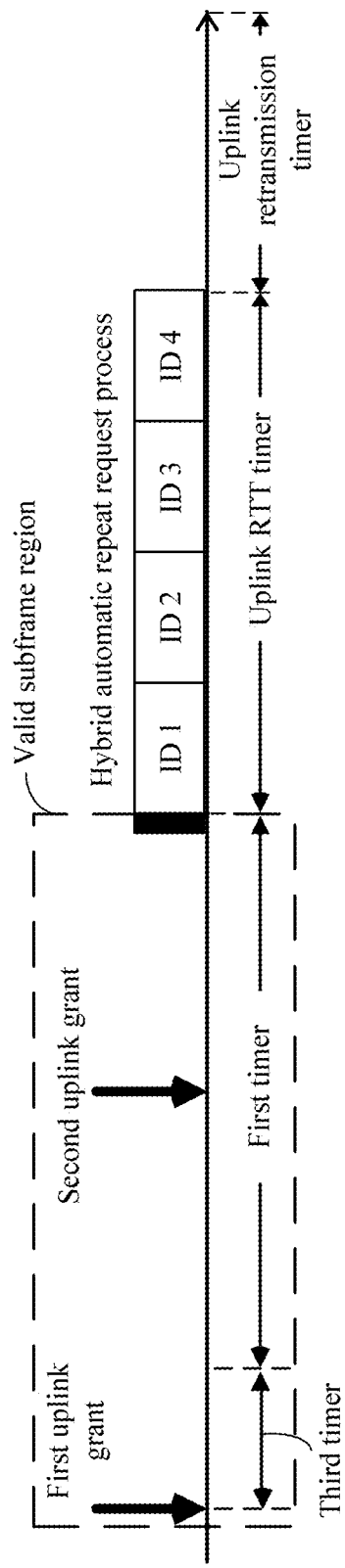
FIG. 3 is a schematic diagram of an example of a data transmission method according to an embodiment of the present application.

To help a person skilled in the art understand the technical solutions of the present application, the following describes an embodiment of the present application with reference to FIG. 3. It should be understood that the description herein is merely an example, and does not constitute any limitation on the present application.

For example, FIG. 3 is a schematic diagram of an example of a data transmission method according to an embodiment of the present application. As shown in FIG. 3, when receiving a first uplink grant (indicating a valid subframe region), a terminal device may start a third timer (for example, a timer defined by the terminal device) in a subframe (the subframe is not shown in FIG. 3) of the first uplink grant. Within the third timer, the terminal device may not need to monitor a PDCCH. After the third timer ends, the terminal device may start a first timer (for example, a DXR-Trigger Timer and/or a DRX Inactivity Timer, or a newly defined timer). The terminal device monitors a second uplink grant during running of the first timer, and then performs data transmission based on the first uplink grant and the second uplink grant. When performing the data transmission, the terminal device starts an uplink HARQ RTT timer. A hybrid automatic repeat request process (HARQ process) of each uplink transmission corresponds to one HARQ process ID (for example, an ID 1, an ID 2, an ID 3, or an ID 4 shown in FIG. 3). Optionally, after the uplink HARQ RTT timer expires, the terminal device starts an uplink retransmission timer, to wait for a possible uplink retransmission resource.

Optionally, in FIG. 3, duration of the first timer may be determined based on duration of the valid subframe region and the third timer. Optionally, a network device may indicate the duration of the first timer to the terminal device by using the first uplink grant.

It should be understood that an end time of the first timer in FIG. 3 does not necessarily overlap with an end time of the valid subframe region, and the terminal device may stop the first timer after receiving the second uplink grant. FIG. 3 is merely an example for description, and sets no limitation thereto.

Optionally, in FIG. 3, if the terminal device does not receive the second uplink grant before the valid subframe region is invalid (this case is not shown in the figure), or does not receive the second uplink grant after a second timer expires (this case is not shown in the figure), the terminal device may start an uplink retransmission timer and/or a DRX Inactivity Timer. This is not limited.

Therefore, in the data transmission method in this embodiment of the present application, the terminal device obtains a first indication, and listens on a physical channel within a preset first time region to obtain a second indication, where the first indication and the second indication are used by the terminal device to determine a resource for the data transmission. It can be ensured that the terminal device obtains the second indication, so as to complete the data transmission in a two-level scheduling mode.

Optionally, in this embodiment of the present application, after the two-level scheduling mode is introduced, how a MAC layer of the terminal device performs packet assembly is also an issue needing to be considered. In the two-level scheduling mode, before the terminal device receives the second uplink grant, the MAC layer of the terminal device is required to generate a transport block in advance and transfer the transport block to a physical layer of the terminal device. However, a current problem is that, if the terminal device does not receive the second uplink grant, the terminal device cannot determine an uplink subframe to be scheduled, and cannot learn based on which subframe the transport block should be generated. The transport block includes one or more MAC control elements (CE), and the MAC CE is a control element for a buffer status report (BSR)/a power headroom report (PHR). For example, the terminal device cannot determine a subframe for calculating a buffer status (BS) and/or power headroom (PH), which may also be understood as a BSR and/or a PHR.

The BSR is used by the terminal device to notify the network device of an amount of to-be-sent data in an uplink buffer of the terminal device, so that the network device determines a quantity of uplink transmission resources needing to be allocated to the terminal device. The PHR is used by the terminal device to report power headroom information (namely, a difference between estimated power of a UL_SCH channel and maximum transmit power of UE) of each cell to the network device, so that the network device adjusts transmit power of the terminal device. The following separately describes a plurality of solutions about how to generate a transport block in the two-level scheduling mode. It should be understood that, for brevity, some concepts in the foregoing description are not described in detail again.

Figure 4:
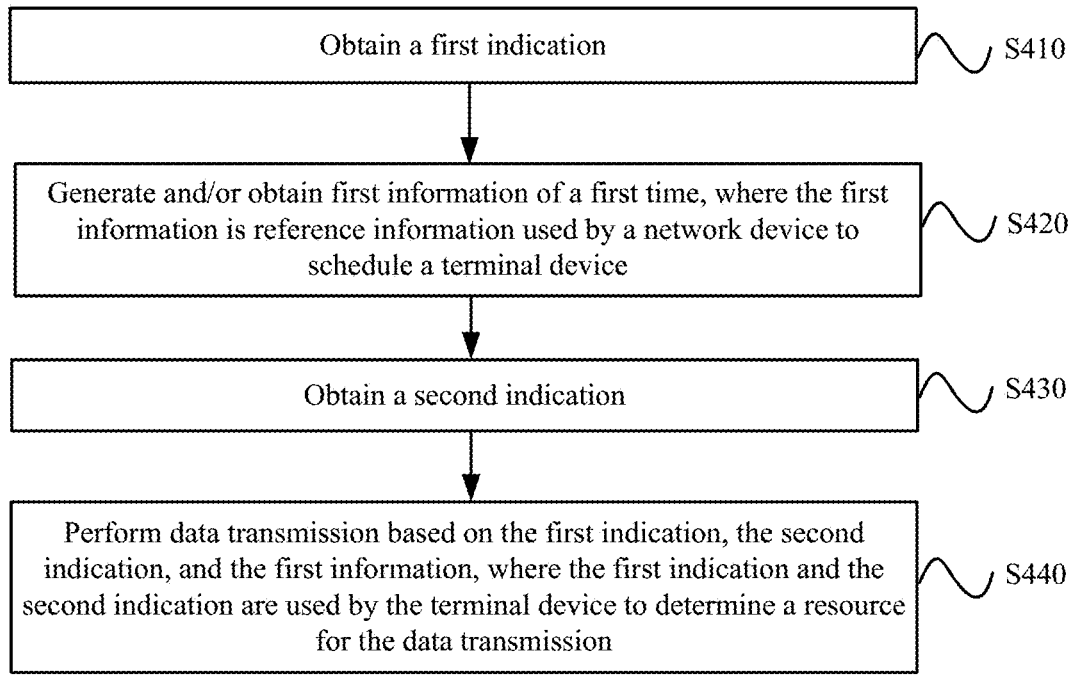
FIG. 4 is a schematic flowchart of a data transmission method according to another embodiment of the present application.

Optionally, in an embodiment, FIG. 4 shows a data transmission method according to another embodiment of the present application. The method may be performed by a terminal device. As shown in FIG. 4, the method 400 includes the following steps.

S410. Obtain a first indication.

S420. Generate and/or obtain first information of a first time, where the first information is reference information used by a network device to schedule the terminal device.

S430. Obtain a second indication.

S440. Perform data transmission based on the first indication, the second indication, and the first information.

The first indication and the second indication are used by the terminal device to determine a resource for the data transmission.

Specifically, the terminal device obtains the first indication, and then may generate the first information of the first time or directly obtain the first information of the first time, where the first information is the reference information used by the network device to schedule the terminal device; and then obtains the second indication, and performs the data transmission based on the first indication, the second indication, and the first information. In this way, a transport block in a two-level scheduling mode can be generated to perform the data transmission. In this embodiment of the present application, the first time may be a specific moment, or may be a specific time period, for example, duration such as a subframe or a transmission time interval (TTI). This is not limited.

In this embodiment of the present application, the first information may be control information of a buffer status and/or power headroom, or may be one or more MAC CEs, or may be a transport block including a MAC CE; or the first information may be a MAC CE for a BSR/a PHR, or may be a MAC service data unit SDU or a MAC protocol data unit PDU. This is not limited.

In this embodiment of the present application, usage of the first information is as follows: The network device may schedule an appropriate resource for the terminal device with reference to the first information, or adjust a related parameter of the terminal device with reference to the first information. For example, the network device may determine, based on the BSR in the first information, an appropriate transmission resource to be allocated to the terminal device. For another example, the network device may learn power headroom information of each cell based on the PHR in the first information, to adjust transmit power of the terminal device.

It should be understood that the first information may be used as a proper reference for assisting the network device in performing scheduling for the terminal device, but the reference may be not limited to the first information.

It needs to be noted that, in this embodiment of the present application, generating or obtaining the "first information" and obtaining the "second indication" are not necessarily performed in a strict order of time. For example, the "first information" is generated or obtained before the "second indication" is obtained; or the "first information" is generated or obtained after the "second indication" is obtained. This is not limited.

Optionally, in this embodiment of the present application, the first indication includes second time indication information, and the second indication includes third time indication information; and the performing data transmission based on the first indication, the second indication, and the first information includes: determining, based on the second time indication information and the third time indication information, a time domain location used to transmit data, and performing the data transmission based on the first information.

Specifically, the terminal device may determine, based on the second time indication information (for example, offset information of a first subframe in a first uplink grant) and the third time indication information (a location of the first subframe in a second uplink grant), a time domain location used to transmit data (that is, determine one or more subframes in which uplink transmission is to be performed one or more times). The terminal device performs the data transmission based on the first information (for example, a data packet or a MAC CE) and the time domain location.

In this embodiment of the present application, the "second time indication information" and the "third time indication information" are introduced only for ease of description, to distinguish from the foregoing "first time", and numbers have no special meaning and do not constitute any limitation on the present application.

Optionally, the generating and/or obtaining first information of a first time may be understood as that the terminal generates and/or obtains the first information based on the first time, or may be understood as that the terminal generates the first information and status information, related to the first time, of the terminal device, but a specific time at which the first information is generated is not limited.

Optionally, in an embodiment, the generating and/or obtaining first information of a first time includes: generating, by a Media Access Control (MAC) layer of the terminal device, a buffer status BS of the terminal device based on the first time, where the first information includes the BS of the terminal device and is the reference information used by the network device to schedule the terminal device.

Specifically, an MAC layer of the terminal device may calculate the BS based on the first time, where the first information includes the BS.

Optionally, in an embodiment, the generating and/or obtaining first information of a first time includes: generating, by a physical (PHY) layer of the terminal device, power headroom (PH) of each active serving cell based on the first time, and notifying the MAC layer of the terminal device of PH of the terminal device, where the first information includes the PH of the terminal device.

Specifically, the PHY layer of the terminal device may calculate the PH based on the first time, and notify the MAC layer of the terminal device of the PH of the terminal device, where the first information includes the PH.

For example, optionally, in an embodiment, the physical (PHY) layer of the terminal device notifies the Media Access Control layer (MAC layer) of the terminal device of the obtained first uplink grant; and the MAC layer of the terminal device determines a reference subframe based on the first uplink grant. The reference subframe may be the same as or different from a subframe that is used by the terminal device to perform the data transmission. The subframe for the data transmission may be determined based on both the first uplink grant and the second uplink grant, or the second uplink grant only. The MAC layer of the terminal device generates a BSR and/or a PHR based on the reference subframe.

In a specific implementation, the PHY layer of the terminal device notifies the MAC layer of a type of an uplink grant, and the MAC layer of the terminal device may use a subframe as a reference subframe when generating a transport block, and then generate a BSR and/or a PHR based on the reference subframe. For example, the terminal device may calculate a buffer status BS parameter and/or a power headroom (PH) parameter based on the reference subframe. For the PHR, the physical layer of the terminal calculates power headroom of each active serving cell based on the reference subframe, and notifies the MAC layer of the terminal device of the power headroom, to generate a PHR MAC CE. For the BSR, the MAC layer of the terminal calculates a buffer status based on the reference subframe, to generate a BSR MAC CE.

In this embodiment of the present application, the reference subframe is different from the subframe that is used by the terminal device to perform the data transmission. For example, duration from a location of the reference subframe to a subframe in which the first uplink grant is received may be at least four subframes.

Optionally, the location of the reference subframe may be specified in a protocol, or may be indicated by a base station. This is not limited.

Therefore, in this embodiment of the present application, the terminal device may calculate the buffer status BS of the terminal device and obtain the power headroom PH of each active serving cell based on the first time, to generate a transport block, so as to perform the data transmission.

Optionally, before the obtaining a first indication, the method further includes: triggering, by the terminal device, reporting of the first information.

Optionally, the method further includes: canceling all triggered reporting of the first information if the MAC layer of the terminal device does not receive the second indication.

Specifically, if the MAC layer of the terminal device does not receive the second indication (for example, the second uplink grant), all triggered reporting of the first information may be canceled.

Optionally, for example, the physical (PHY) layer of the terminal device notifies the Media Access Control (MAC) layer of the terminal device of the first uplink grant (included in the first indication) of the terminal device. If the MAC layer of the terminal device obtains the first uplink grant (or learns that the uplink grant is the two-level scheduling mode), the terminal device never reports a BSR and/or PHR MAC CE in the two-level scheduling mode. Alternatively, after generating a transport block that does not include a BSR and/or a PHR, the terminal device may not cancel the BSR and/or the PHR triggered by the MAC layer of the terminal device, so that after subsequently receiving a one-level scheduling uplink grant, the terminal device generates a BSR/PHR MAC CE, and reports the BSR/PHR MAC CE to the network device in a timely manner, so as to better deliver a scheduling policy.

Optionally, if a previous transport block of the terminal device has not yet been successfully sent, when any transport block or MAC PDU is generated, a data amount of the previously generated transport block may be considered or not considered. This is not limited.

For example, the Media Access Control (MAC) layer of the terminal device obtains the first uplink grant and the second uplink grant that are sent by the physical (PHY) layer of the terminal device; the PHY layer of the terminal device generates a MAC SDU or a MAC PDU based on a subframe that is indicated in the first uplink grant and the second uplink grant; the MAC layer of the terminal device generates a buffer status parameter based on the subframe that is indicated in the first uplink grant and the second uplink grant; and the PHY layer of the terminal device generates a power headroom parameter based on the subframe that is indicated in the first uplink grant and the second uplink grant, and notifies the MAC layer of the power headroom parameter.

Specifically, when performing packet assembly, the MAC layer of the terminal device may first obtain the first uplink grant and the second uplink grant that are sent by the PHY layer, and then determine a transmission subframe based on the first uplink grant and the second uplink grant. The MAC layer of the terminal calculates the buffer status BS parameter based on the transmission subframe. Optionally, the MAC layer of the terminal device further generates a BSR MAC CE. The PHY layer of the terminal calculates the power headroom (PH) parameter based on the transmission subframe, and notifies the MAC layer of the power headroom PH parameter. Optionally, the MAC layer of the terminal device further generates a PHR MAC CE.

Therefore, in this embodiment of the present application, by using the foregoing solution, the MAC layer of the terminal device may generate a transport block in the two-level scheduling mode, and may further calculate the BSR and/or PHR parameter in the two-level scheduling mode.

Optionally, in an embodiment, the method includes: associating, by the Media Access Control (MAC) layer of the terminal device, with a hybrid automatic repeat request (HARQ) module based on the first time, and storing the first information into the HARQ module, so that the PHY layer of the terminal device transmits the first information.

For example, after receiving the first indication, the PHY layer of the terminal device instructs the MAC layer of the terminal device to perform a packet assembly process. A MAC link layer multiplexing and assembly module layer of the terminal device generates the first information of the first time (a subframe or a moment), for example, a data packet including the PH and/or the BS, sends the data packet to the HARQ module, and instructs the PHY layer of the terminal device to perform the data transmission. The PHY layer of the terminal device completes the data transmission in the two-level scheduling mode based on the data packet.

In this embodiment of the present application, when receiving the second uplink grant, the MAC layer of the terminal device may transfer the generated data packet to the HARQ module; or may directly transfer the data packet to the HARQ module without considering whether the second uplink grant is received. When not considering whether the second uplink grant is received, the terminal device may process a HARQ process using a reference transmission time interval (TTI); or, optionally, when the second uplink grant is not received, the MAC layer of the terminal device may roll the generated data packet back to a Radio Link Control (RLC) layer, to wait for an uplink resource of any serving cell for a next time. This is not limited.

Optionally, in this embodiment of the present application, after the two-level scheduling mode is introduced, the PHY layer of the terminal device may calculate channel state information (CSI).

Specifically, after receiving the second uplink grant, the terminal device may use the subframe indicated in the second uplink grant as a subframe for calculating the CSI, or may select an available downlink subframe that is closest to the subframe indicated in the second uplink grant as a subframe for calculating the CSI, or may select another appropriate reference subframe. This is not limited.

Therefore, in the data transmission method in this embodiment of the present application, the PHY layer of the terminal device may calculate the CSI in the two-level scheduling mode. Further, the terminal device may select a subframe to calculate the CSI.

Optionally, in this embodiment of the present application, when the terminal device performs the data transmission after receiving the second uplink grant, if power is limited, the terminal device may perform power back-off, or the terminal device may give up uplink transmission of two-level scheduling. This is not limited.

Therefore, in the data transmission method in this embodiment of the present application, the MAC layer of the terminal device may complete the packet assembly process in the two-level scheduling mode, to implement the data transmission.

In all embodiments of the present application, the terminal device may determine, based on both the first indication and the second indication, a location of a subframe for sending data. Alternatively, optionally, the terminal device may determine, based only on a location that is indicated in the second indication and that is of a subframe for sending data, the location of the subframe for sending data. Specifically, the first indication may indicate a new data indicator (NDI), a HARQ process ID, a redundancy version (RV), a size of a time-frequency resource block/a size of an uplink resource, or the like, so that the terminal device performs time-independent processing. For example, the terminal device may generate one or more MAC SDUs or MAC PDUs. The second indication is used to indicate the location of the subframe for sending data by the terminal, and then the terminal device performs data transmission for the MAC PDU based on the first indication and the second indication.

The foregoing describes in detail the data transmission methods according to the embodiments of the present application, and the following describes a terminal device according to an embodiment of the present application.

Figure 5:
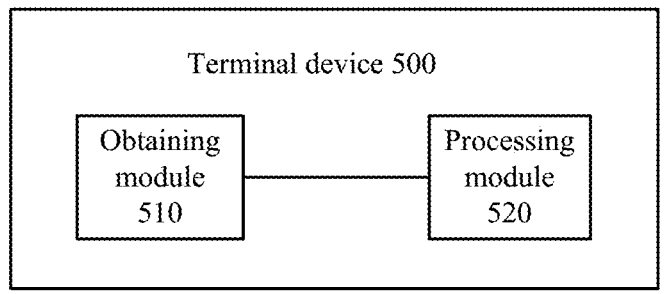
FIG. 5 is a schematic block diagram of a terminal device according to an embodiment of the present application.

FIG. 5 is a schematic block diagram of a terminal device 500 according to an embodiment of the present application.

As shown in FIG. 5, the terminal device 500 includes: an obtaining module 510, configured to obtain a first indication; and a processing module 520, configured to monitor a physical channel within a preset first time region to obtain a second indication, where the first indication obtained by the obtaining module 510 and the second indication obtained by the processing module 520 are used by the terminal device to determine a resource for data transmission.

In this embodiment of the present application, the terminal device 500 obtains the first indication, and listens on the physical channel within the preset first time region to obtain the second indication, where the first indication and the second indication are used by the terminal device to determine the resource for the data transmission. It can be ensured that the terminal device obtains the second indication, so as to complete the data transmission in a two-level scheduling mode.

Optionally, in an embodiment, the processing module 520 is configured to: stop monitoring the physical channel if the second indication is obtained within the preset first time region.

Optionally, the first indication includes information about a range of the preset first time region.

Optionally, in an embodiment, the terminal device 500 further includes: a transmission module, configured to perform the data transmission on the resource based on the first indication and the second indication if the second indication is obtained.

Optionally, in an embodiment, the processing module 520 is specifically configured to: start or restart a first timer, where duration of the first timer is duration of the preset first time region; and monitor the physical channel during running of the first timer to obtain the second indication.

Optionally, in an embodiment, the processing module 520 is further configured to: stop the first timer, if the first timer does not expire and/or does not stop when or after the second indication is obtained.

Optionally, in an embodiment, the processing module 520 is specifically configured to: start or restart the first timer when or after the first indication is obtained.

Optionally, in an embodiment, the processing module 520 is specifically configured to: if the second indication is not obtained during running of the first timer, start a second timer, where the second timer is used to wait for an uplink resource for retransmission.

Optionally, in an embodiment, the processing module 520 is further configured to: start a third timer when the first indication is received; stop monitoring the physical channel during running of the third timer; and start or restart the first timer when the third timer expires and/or stops.

Optionally, in some possible implementations, the duration of the first timer is indicated by network device by using the first indication or Radio Resource Control (RRC) signaling.

Optionally, in some possible implementations, the first timer includes any one of a retransmission timer, an inactivity timer, an on duration timer, and a newly introduced timer.

Optionally, in an embodiment, the processing module 520 is further configured to: when the first indication is obtained, if a fourth timer is running, monitor the physical channel within an intersection time period that is determined between the preset first time region and a running time of the fourth timer, to obtain the second indication; or before the second indication is obtained, if a fourth timer is running, skip stopping the fourth timer, where the fourth timer is within the preset first time region; and monitor the physical channel during running of the fourth timer to obtain the second indication.

Optionally, in an embodiment, the processing module 520 is specifically configured to: stop the fourth timer, if the fourth timer does not expire and/or does not stop when or after the second indication is obtained.

Optionally, in some possible implementations, the fourth timer includes any one of a retransmission timer, an inactivity timer, an on duration timer, and a newly introduced timer.

The terminal device 500 according to this embodiment of the present application can perform the data transmission method 200 according to the foregoing embodiment of the present application, and the foregoing and other operations and/or functions of the modules in the terminal device 500 are respectively used to implement corresponding processes of the foregoing method. For brevity, details are not described herein again.

Therefore, the terminal device 500 in this embodiment of the present application obtains the first indication, and listens on the physical channel within the preset first time region to obtain the second indication, where the first indication and the second indication are used by the terminal device to determine the resource for the data transmission. It can be ensured that the terminal device obtains the second indication, so as to complete the data transmission in the two-level scheduling mode.

Figure 6:
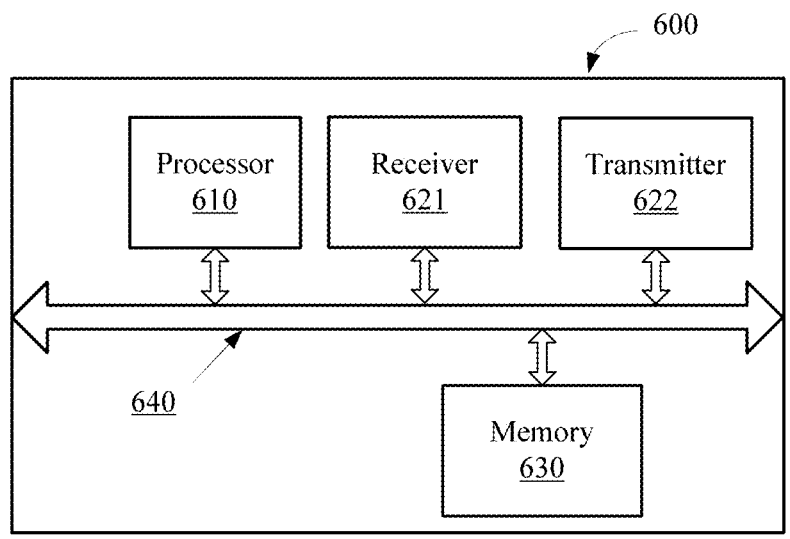
FIG. 6 is a structural block diagram of a terminal device according to an embodiment of the present application.

It should be noted that, in this embodiment of the present application, the obtaining module 510 may be implemented by a transceiver, and the processing module 520 may be implemented by a processor. As shown in FIG. 6, a terminal device 600 may include a processor 610, a transceiver 620, and a memory 630. The transceiver 620 may include a receiver 621 and a transmitter 622. The memory 630 may be configured to store code to be executed by the processor 610, and the like. Various components in the terminal device 600 are coupled by using a bus system 640. The bus system 640 further includes a power bus, a control bus, a status signal bus, and the like, in addition to a data bus. The transceiver 620 is configured to: obtain a first indication; and the processor 610 is specifically configured to: monitor a physical channel within a preset first time region to obtain a second indication, where the first indication and the second indication are used by the terminal device to determine a resource for data transmission.

Optionally, in an embodiment, the processor 610 is specifically configured to: stop monitoring the physical channel if the second indication is obtained within the preset first time region.

Optionally, in an embodiment, the processor 610 is specifically configured to: perform the data transmission on the resource based on the first indication and the second indication if the second indication is obtained.

Optionally, the first indication includes information about a range of the preset first time region.

Optionally, in an embodiment, the processor 610 is specifically configured to: start or restart a first timer, where duration of the first timer is duration of the preset first time region.

Optionally, in an embodiment, the processor bio is specifically configured to: monitor the physical channel during running of the first timer to obtain the second indication.

Optionally, in an embodiment, the processor bio is specifically configured to: stop the first timer, if the first timer does not expire and/or does not stop when or after the second indication is obtained.

Optionally, in an embodiment, the processor bio is specifically configured to: start or restart the first timer when or after the first indication is obtained.

Optionally, in an embodiment, the processor bio is specifically configured to: if the second indication is not obtained after the first timer expires and/or stops, start a second timer, where the second timer is used to wait for an uplink resource for retransmission.

Optionally, in an embodiment, the processor bio is specifically configured to: start a third timer when the first indication is received; skip monitoring the physical channel during running of the third timer; and start or restart the first timer when the third timer expires.

Optionally, the duration of the first timer is indicated by the network device by using the first indication or Radio Resource Control (RRC) signaling.

Optionally, the first timer includes any one of a retransmission timer, an inactivity timer, an on duration timer, and a newly introduced timer.

Optionally, in an embodiment, the processor bio is specifically configured to: monitor the physical channel within the preset first time region to obtain the second indication, including: monitoring within an intersection time period that is determined between the preset first time region and a running time of a fourth timer, on the physical channel to obtain the second indication; or before the second indication is obtained, if a fourth timer is running, skipping stopping the fourth timer, where the fourth timer is within the preset first time region; and monitoring the physical channel during running of the fourth timer to obtain the second indication.

Optionally, in an embodiment, the processor 610 is specifically configured to: stop the fourth timer, if the fourth timer does not expire and/or does not stop when or after the second indication is obtained.

Optionally, the fourth timer includes any one of a retransmission timer, an inactivity timer, an on duration timer, and a newly introduced timer.

In this embodiment of the present application, the terminal device 600 in this embodiment of the present application obtains the first indication, and monitors the physical channel within the preset first time region to obtain the second indication, where the first indication and the second indication are used by the terminal device to determine the resource for the data transmission. It can be ensured that the terminal device obtains the second indication, so as to complete the data transmission in a two-level scheduling mode.

Figure 7:
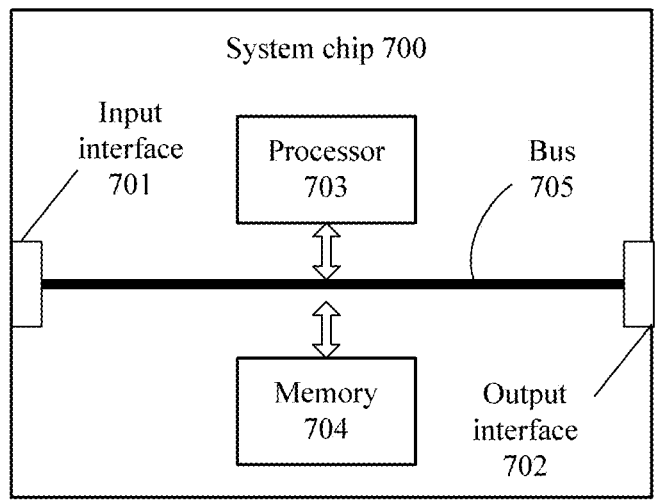
FIG. 7 is a schematic structural diagram of a system chip according to an embodiment of the present application.

FIG. 7 is a schematic structural diagram of a system chip according to an embodiment of the present application. The system chip 700 in FIG. 7 includes an input interface 701, an output interface 702, at least one processor 703, and a memory 704. The input interface 701, the output interface 702, the processor 703, and the memory 704 are connected by using a bus 705. The processor 703 is configured to execute code in the memory 704. When the code is executed, the processor 703 implements the methods that are performed by the terminal device in FIG. 2 and FIG. 3.

The terminal device 500 shown in FIG. 5, or the terminal device 600 shown in FIG. 6, or the system chip 700 shown in FIG. 7 can implement various processes that are implemented by the terminal device in the foregoing method embodiments of FIG. 2 and FIG. 3. To avoid repetition, details are not described herein again.

It may be understood that the processor in the embodiments of the present application may be an integrated circuit chip having a signal processing capability. In an implementation process, various steps in the foregoing method embodiments may be implemented by using a hardware integrated logical circuit in the processor, or by using instructions in a form of software. The processor may be a general-purpose processor, a digital signal processor ("DSP" for short), an application-specific integrated circuit ("ASIC" for short), a field programmable gate array ("FPGA" for short) or another programmable logic device, a discrete gate or a transistor logic device, or a discrete hardware component; and can implement or perform the methods, steps, and logical block diagrams that are disclosed in the embodiments of the present application. The general-purpose processor may be a microprocessor, or the processor may be any conventional processor or the like. Steps of the methods disclosed with reference to the embodiments of the present application may be directly embodied as being executed by a hardware decoding processor, or executed by a combination of hardware of a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and performs the steps in the foregoing methods in combination with hardware of the processor.

It may be understood that the memory in the embodiments of the present application may be a volatile memory or a non-volatile memory, or may include both a volatile memory and a non-volatile memory. The non-volatile memory may be a read-only memory ("ROM" for short), a programmable read-only memory ("PROM" for short), an erasable programmable read-only memory ("EPROM" for short), an electrically erasable programmable read-only memory ("EEPROM" for short), or a flash memory. The volatile memory may be a random access memory ("RAM" for short) used as an external cache. By way of example rather than limitation, many forms of RAMs, such as a static random access memory ("SRAM" for short), a dynamic random access memory ("DRAM" for short), a synchronous dynamic random access memory ("SDRAM" for short), a double data rate synchronous dynamic random access memory ("DDR SDRAM" for short), an enhanced synchronous dynamic random access memory ("ESDRAM" for short), a synchlink dynamic random access memory ("SLDRAM" for short), and a direct rambus random access memory ("DR RAM" for short), may be used. It should be noted that the memories of the systems and methods described in this specification include but are not limited to the foregoing and any other proper types of memories.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 8:
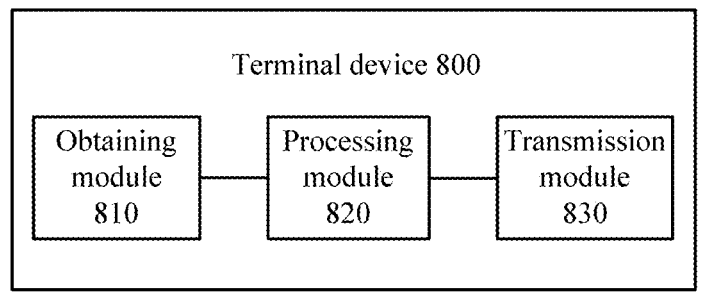
FIG. 8 is a schematic block diagram of a terminal device according to another embodiment of the present application.

The following describes a terminal device provided in another embodiment of the present application. FIG. 8 is a schematic block diagram of a terminal device 800 according to another embodiment of the present application. As shown in FIG. 8, the terminal device 800 includes: an obtaining module 810, configured to obtain a first indication; a processing module 820, configured to generate and/or obtain first information of a first time, where the first information is reference information used by a network device to schedule the terminal; and the obtaining module 810 is further configured to obtain a second indication; and a transmission module 830, configured to perform data transmission based on the first indication and the second indication that are obtained by the obtaining module 810 and the first information that is obtained by the processing module 820, where the first indication and the second indication are used by the terminal to determine a resource for the data transmission.

In this embodiment of the present application, the terminal device 800 obtains the first indication, and then generates the first information of the first time or directly obtains the first information of the first time, where the first information is the reference information used by the network device to schedule the terminal device; and then obtains the second indication, and performs the data transmission based on the first indication, the second indication, and the first information. In this way, a transport block in a two-level scheduling mode can be generated to perform the data transmission.

In some possible implementations, the first indication includes second time indication information, and the second indication includes third time indication information; and the processing module 820 is specifically configured to: determine, based on the second time indication information and the third time indication information, a time domain location used to transmit data, and perform the data transmission based on the first information.

Optionally, in an embodiment, the processing module 820 is specifically configured to: determine a buffer status (BS) of the terminal device based on the first time, where the first information includes the BS of the terminal device.

Optionally, in an embodiment, the processing module 820 is specifically configured to: determine power headroom (PH) of each active serving cell based on the first time, and notify a MAC layer of the terminal device of PH of the terminal device, where the first information includes the PH of the terminal device.

Optionally, in an embodiment, the processing module 820 is specifically configured to: associate with a hybrid automatic repeat request (HARQ) module based on the first time, and store the first information into the HARQ module, so that a PHY layer of the terminal device transmits the first information.

Optionally, in an embodiment, the processing module 820 is specifically configured to: trigger reporting of the first information.

Optionally, in an embodiment, the processing module 820 is specifically configured to: cancel all triggered reporting of the first information if the MAC layer of the terminal device does not receive the second indication.

The terminal device 800 according to this embodiment of the present application can perform the data transmission method 400 according to the foregoing embodiment of the present application, and the foregoing and other operations and/or functions of the modules in the terminal device 800 are respectively used to implement corresponding processes of the foregoing method. For brevity, details are not described herein again.

Therefore, the terminal device 800 in this embodiment of the present application obtains the first indication, and then generates the first information of the first time or directly obtains the first information of the first time, where the first information is the reference information used by the network device to schedule the terminal device; and then obtains the second indication, and performs the data transmission based on the first indication, the second indication, and the first information. In this way, a transport block in the two-level scheduling mode can be generated to perform the data transmission.

Figure 9:
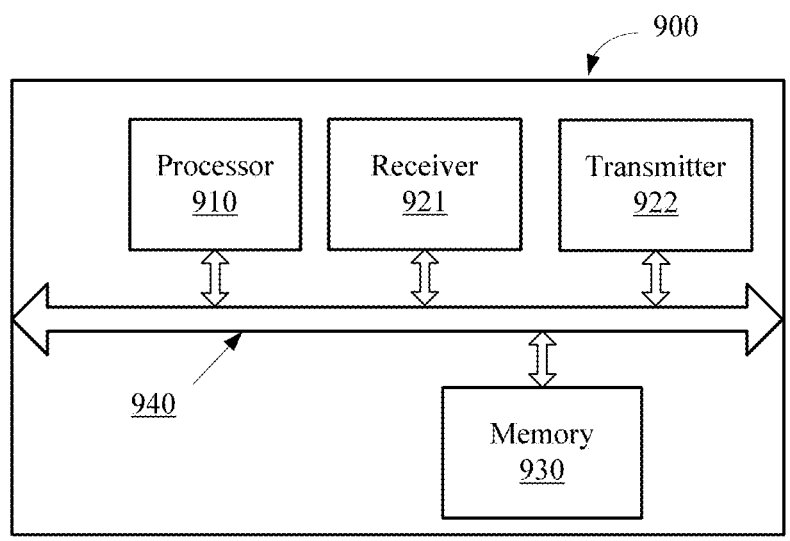
FIG. 9 is a structural block diagram of a terminal device according to another embodiment of the present application.

It should be noted that, in this embodiment of the present application, the obtaining module 810 and the transmission module 830 may be implemented by a transceiver, and the processing module 820 may be implemented by a processor. As shown in FIG. 9, a terminal device 900 may include a processor 910, a transceiver 920, and a memory 930. The transceiver 920 may include a receiver 921 and a transmitter 922. The memory 930 may be configured to store code to be executed by the processor 910, and the like. Various components in the terminal device 900 are coupled by using a bus system 940. The bus system 940 further includes a power bus, a control bus, a status signal bus, and the like, in addition to a data bus. The transceiver 920 is configured to: obtain a first indication.

The processor 910 is configured to generate and/or obtain first information of a first time, where the first information is reference information used by a network device to schedule the terminal.

The transceiver 920 is further configured to obtain a second indication.

The transceiver 920 is further configured to perform data transmission based on the first indication, the second indication, and the first information.

In this embodiment of the present application, the terminal device 900 obtains the first indication, and then generates the first information of the first time or directly obtains the first information of the first time, where the first information is the reference information used by the network device to schedule the terminal device; and then obtains the second indication, and performs the data transmission based on the first indication, the second indication, and the first information. In this way, a transport block in a two-level scheduling mode can be generated to perform the data transmission.

In some possible implementations, the first indication includes second time indication information, and the second indication includes third time indication information; and the processor 910 is specifically configured to: determine, based on the second time indication information and the third time indication information, a time domain location used to transmit data, and perform the data transmission based on the first information.

Optionally, in an embodiment, the processor 910 is specifically configured to: determine a buffer status (BS) of the terminal device based on the first time, where the first information includes the BS of the terminal device.

Optionally, in an embodiment, the processor 910 is specifically configured to: determine power headroom (PH) of each active serving cell based on the first time, and notify the MAC layer of the terminal device of PH of the terminal device, where the first information includes the PH of the terminal device.

Optionally, in an embodiment, the processor 910 is specifically configured to: associate with a hybrid automatic repeat request (HARQ) module based on the first time, and store the first information into the HARQ module, so that a PHY layer of the terminal device transmits the first information.

Optionally, in an embodiment, the processor 910 is specifically configured to: trigger reporting of the first information.

Optionally, in an embodiment, the processor 910 is specifically configured to: cancel all triggered reporting of the first information if the MAC layer of the terminal device does not receive the second indication.

In this embodiment of the present application, the terminal device 900 obtains the first indication, and then generates the first information of the first time or directly obtains the first information of the first time, where the first information is the reference information used by the network device to schedule the terminal device; and then obtains the second indication, and performs the data transmission based on the first indication, the second indication, and the first information. In this way, a transport block in a two-level scheduling mode can be generated to perform the data transmission.

Figure 10:
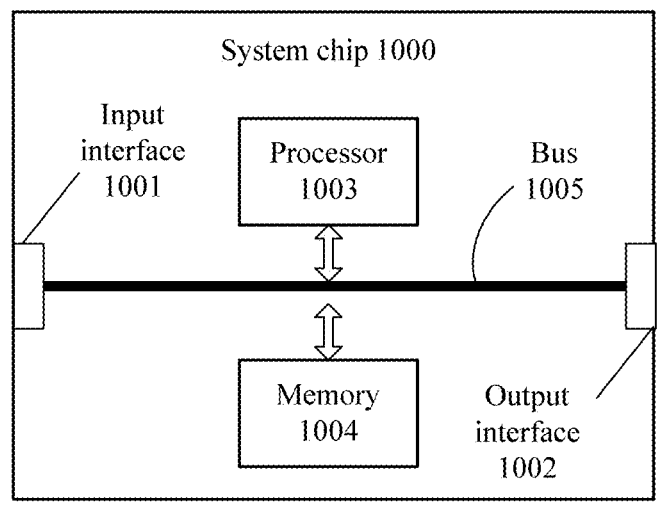
FIG. 10 is a schematic structural diagram of a system chip according to another embodiment of the present application.

FIG. 10 is a schematic structural diagram of a system chip according to another embodiment of the present application. The system chip 1000 in FIG. 10 includes an input interface 1001, an output interface 1002, at least one processor 1003, and a memory 1004. The input interface 1001, the output interface 1002, the processor 1003, and the memory 1004 are connected by using a bus 1005. The processor 1003 is configured to execute code in the memory 1004. When the code is executed, the processor 1003 implements the method performed by the terminal device in FIG. 4.

The terminal device 800 shown in FIG. 8, or the terminal device 900 shown in FIG. 9, or the system chip 1000 shown in FIG. 10 can implement various processes that are implemented by the terminal device in the foregoing method embodiment of FIG. 4. To avoid repetition, details are not described herein again.

It may be understood that the processor in the embodiments of the present application may be an integrated circuit chip having a signal processing capability. In an implementation process, various steps in the foregoing method embodiments may be implemented by using a hardware integrated logical circuit in the processor, or by using instructions in a form of software. The processor may be a general-purpose processor, a digital signal processor ("DSP" for short), an application-specific integrated circuit ("ASIC" for short), a field programmable gate array ("FPGA" for short) or another programmable logic device, a discrete gate or a transistor logic device, or a discrete hardware component; and can implement or perform the methods, steps, and logical block diagrams that are disclosed in the embodiments of the present application. The general-purpose processor may be a microprocessor, or the processor may be any conventional processor or the like. Steps of the methods disclosed with reference to the embodiments of the present application may be directly embodied as being executed by a hardware decoding processor, or executed by a combination of hardware of a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of the present application may be a volatile memory or a non-volatile memory, or may include both a volatile memory and a non-volatile memory. The non-volatile memory may be a read-only memory ("ROM" for short), a programmable read-only memory ("PROM" for short), an erasable programmable read-only memory ("EPROM" for short), an electrically erasable programmable read-only memory ("EEPROM" for short), or a flash memory. The volatile memory may be a random access memory ("RAM" for short) used as an external cache. By way of example rather than limitation, many forms of RAMs, such as a static random access memory ("SRAM" for short), a dynamic random access memory ("DRAM" for short), a synchronous dynamic random access memory ("SDRAM" for short), a double data rate synchronous dynamic random access memory ("DDR SDRAM" for short), an enhanced synchronous dynamic random access memory ("ESDRAM" for short), a synchlink dynamic random access memory ("SLDRAM" for short), and a direct rambus random access memory ("DR RAM" for short), may be used. It should be noted that the memories of the systems and methods described in this specification include but are not limited to the foregoing and any other proper types of memories.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of the present application, "B corresponding to A" indicates that B is associated with A, and B may be determined based on A. However, it should be further understood that determining A based on B does not mean that B is determined based only on A, but B may alternatively be determined based on A and/or other information.

It should be understood that sequence numbers of the foregoing processes do not mean priorities of execution sequences in the embodiments of the present application. The execution sequences of the processes should be determined based on functions and internal logic of the processes, but should not be construed as any limitation on the implementation processes of the embodiments of the present application.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and pails shown as units may or may not be physical units, that is, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units may be integrated into one unit.

When functions are implemented in a form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
   obtaining, by a terminal device, a first indication;
   monitoring, by the terminal device, a physical channel within a preset first time region for a second indication, wherein monitoring, by the terminal device, the physical channel within the preset first time region for the second indication comprises:
      starting or restarting, by the terminal device, a first timer, wherein a duration of the first timer is a duration of the preset first time region, wherein the first timer is implemented in a discontinuous reception ("DRX") mechanism of the terminal device, the first timer is a DRX retransmission timer, a DRX inactivity timer, or a DRX on duration timer, and the preset first time region is a preset length of time in which the second indication is receivable;
      monitoring, by the terminal device, the physical channel during a running of the first timer for the second indication;
      in response to the terminal device not obtaining the second indication during the running of the first timer, and in response to the first timer expiring, starting a second timer, wherein the second timer is used to wait for an uplink resource, the second time is implemented in a DRX mechanism of the terminal device, the second timer is a DRX uplink retransmission timer, and the second time starts when the first timer expires; and
   determining, by the terminal device, a resource for data transmission using the first indication and the second indication, or the uplink resource.

2. The method according to claim 1, wherein monitoring the physical channel for the second indication further comprises:
   stopping, by the terminal device, monitoring the physical channel in response to the terminal device obtaining the second indication within the preset first time region.

3. The method according to claim 1, further comprising:
   when the terminal device obtains the second indication, performing, by the terminal device, the data transmission using the resource based on the first indication and the second indication.

4. The method according to claim 1, wherein the first indication comprises information about a range of the preset first time region.

5. The method according to claim 1, further comprising:
   stopping, by the terminal device, the first timer in response to the terminal device obtaining the second indication.

6. The method according to claim 1, wherein starting or restarting, by the terminal device, the first timer comprises:
   starting or restarting, by the terminal device, the first timer in response to obtaining the first indication.

7. The method according to claim 1, further comprising:
   starting, by the terminal device, a third timer when obtaining the first indication; and
   stopping, by the terminal device during a running of the third timer, monitoring the physical channel;
   wherein starting or restarting the first timer comprises:
      starting or restarting the first timer when the third timer expires.

8. A terminal device, comprising:
   a non-transitory memory storing instructions; and
   one or more processors coupled to the memory, wherein the one or more processors are configured to execute the instructions to:
      obtain a first indication;
      monitor a physical channel within a preset first time region for a second indication, wherein monitoring the physical channel within the preset first time region comprises:
         start or restart a first timer, wherein a duration of the first timer is a duration of the preset first time region, wherein the first timer is implemented in a discontinuous reception ("DRX") mechanism of the terminal device, the first timer is a DRX retransmission timer, a DRX inactivity timer, or a DRX on duration timer, and the preset first time region is a preset length of time in which the second indication is receivable; and
         monitor the physical channel during a running of the first timer for the second indication;
         in response to the terminal device not obtaining the second indication during the running of the first timer, and in response to the first timer expiring, start a second timer, wherein the second timer is used to wait for an uplink resource, the second time is implemented in a DRX mechanism of the terminal device, the second timer is a DRX uplink retransmission timer, and the second time starts when the first timer expires; and use the first indication and the second indication, or the uplink resource, to determine a resource for data transmission.

9. The terminal device according to claim 8, wherein the one or more processors being configured to execute the instructions to monitor the physical channel within the preset first time region further comprises the one or more processors being configured to execute the instructions to:
stop monitoring the physical channel in response to the second indication being obtained within the preset first time region.

10. The terminal device according to claim 8, wherein the one or more processors are further to execute the instructions to:
when the second indication is obtained, perform the data transmission on the resource based on the first indication and the second indication.

11. The terminal device according to claim 8, wherein the first indication comprises information about a range of the preset first time region.

12. The terminal device according to claim 8, wherein the one or more processors are further configured to execute the instructions to:
stop the first timer when the second indication is obtained.

13. The terminal device according to claim 8, wherein the one or more processors being configured to execute the instructions to start or restart the first timer comprises the one or more processors being configured to execute the instructions to:
start or restart the first timer when the first indication is obtained.

14. The terminal device according to claim 8, wherein the one or more processors are further configured to execute the instructions to:
start a third timer when the first indication is obtained;
stop monitoring the physical channel during running of the third timer; and
start or restart the first timer when the third timer expires.

* * * * *